(12) United States Patent
Evans et al.

(10) Patent No.: US 11,208,539 B2
(45) Date of Patent: *Dec. 28, 2021

(54) HYDROPHOBIC AEROGEL MATERIALS

(71) Applicant: Aspen Aerogels, Inc., Northborough, MA (US)

(72) Inventors: Owen R Evans, Chelmsford, MA (US); Kathryn E deKrafft, Marlborough, MA (US); Nicholas A Zafiropoulos, Wayland, MA (US); Wenting Dong, Marlborough, MA (US); David J Mihalcik, Northborough, MA (US); George L Gould, Mendon, MA (US); Irene Melnikova, Plainville, MA (US)

(73) Assignee: Aspen Aerogels, Inc., Northborough, MA (US)

( * ) Notice: Subject to any disclaimer, the term of this patent is extended or adjusted under 35 U.S.C. 154(b) by 162 days.

This patent is subject to a terminal disclaimer.

(21) Appl. No.: 16/298,212

(22) Filed: Mar. 11, 2019

(65) Prior Publication Data
US 2019/0203014 A1     Jul. 4, 2019

Related U.S. Application Data

(63) Continuation of application No. 15/835,005, filed on Dec. 7, 2017, now Pat. No. 10,253,159, and a continuation of application No. 15/835,136, filed on Dec. 7, 2017, now Pat. No. 10,233,302, and a continuation of application No. 15/835,190, filed on Dec. 7, 2017, now Pat. No. 10,227,472, and a continuation of application No. 15/835,258, filed on Dec. 7, 2017, now Pat. No. 10,233,303, said application No. 15/835,005 is a continuation of application No. 14/873,753, filed on Oct. 2, 2015, now Pat. No. 9,868,843, said application No. 15/835,136 is a continuation of application No. 14/873,753, filed on Oct. 2, 2015, now Pat. No. 9,868,843, said application No. 15/835,190 is a continuation of application No. 14/873,753, filed on Oct. 2, 2015, now Pat. No. 9,868,843, said application No. 15/835,258 is a continuation of application No. 14/873,753, filed on Oct. 2, 2015, now Pat. No. 9,868,843.

(60) Provisional application No. 62/059,555, filed on Oct. 3, 2014, provisional application No. 62/118,864, filed on Feb. 20, 2015, provisional application No. 62/232,945, filed on Sep. 25, 2015.

(51) Int. Cl.
| | |
|---|---|
| *B01J 13/00* | (2006.01) |
| *C01B 33/158* | (2006.01) |
| *C01B 33/159* | (2006.01) |
| *C08J 3/075* | (2006.01) |
| *C08J 9/28* | (2006.01) |
| *C08K 3/04* | (2006.01) |
| *C08K 3/22* | (2006.01) |
| *C08K 3/34* | (2006.01) |
| *C08K 3/36* | (2006.01) |
| *C08K 3/38* | (2006.01) |

(52) U.S. Cl.
CPC .............. *C08K 3/36* (2013.01); *B01J 13/0091* (2013.01); *C01B 33/159* (2013.01); *C01B 33/1585* (2013.01); *C08K 3/04* (2013.01); *C08K 3/22* (2013.01); *C08K 3/34* (2013.01); *C08K 3/38* (2013.01); *C08J 9/28* (2013.01); *C08J 2205/026* (2013.01); *C08K 2003/2241* (2013.01); *C08K 2003/2262* (2013.01)

(58) Field of Classification Search
CPC ................................................. C08J 2205/026
See application file for complete search history.

(56) References Cited

U.S. PATENT DOCUMENTS

| | | | | |
|---|---|---|---|---|
| 2,188,007 A | * | 1/1940 | Kistler .................... | B01J 21/00 252/62 |
| 3,672,833 A | * | 6/1972 | Teichner et al. .... | C01B 33/1585 423/338 |

(Continued)

FOREIGN PATENT DOCUMENTS

| | | |
|---|---|---|
| CL | 199301034 | 3/1993 |
| CL | 199501892 | 7/1995 |

(Continued)

OTHER PUBLICATIONS

Kang et al., "Synthesis of low-density silica gel at ambient pressure: Effect of heat treatment", 2000, Journal of Materials Science, 35, 2971-4976 (Year: 2000).*

(Continued)

*Primary Examiner* — Melissa A Rioja
(74) *Attorney, Agent, or Firm* — Christopher Stow; Poongunran Muthkumaran

(57) ABSTRACT

The present disclosure provides an aerogel composition which is durable and easy to handle, which has favorable performance in aqueous environments, and which also has favorable combustion and self-heating properties. Also provided is a method of preparing an aerogel composition which is durable and easy to handle, which has favorable performance in aqueous environments, and which has favorable combustion and self-heating properties. Further provided is a method of improving the hydrophobicity, the liquid water uptake, the heat of combustion, or the onset of thermal decomposition temperature of an aerogel composition.

20 Claims, 1 Drawing Sheet

(56) References Cited

U.S. PATENT DOCUMENTS

| | | | | |
|---|---|---|---|---|
| 3,920,865 | A * | 11/1975 | Laufer | C01B 33/113 427/220 |
| 4,007,050 | A * | 2/1977 | Laufer | C01B 13/145 106/483 |
| 4,022,152 | A * | 5/1977 | Laufer | C01B 13/145 118/716 |
| 4,036,933 | A | 7/1977 | Laufer et al. | |
| 4,363,738 | A * | 12/1982 | Kummermehr | C04B 26/02 252/62 |
| 4,402,927 | A * | 9/1983 | von Dardel | C04B 38/0045 423/335 |
| 4,432,956 | A * | 2/1984 | Zarzycki | B01J 13/0052 423/335 |
| 4,447,345 | A * | 5/1984 | Kummermehr | B32B 9/041 252/62 |
| 4,619,908 | A * | 10/1986 | Cheng | B01J 13/0052 423/338 |
| 4,667,417 | A * | 5/1987 | Graser | B01D 11/0203 34/337 |
| 4,717,708 | A | 1/1988 | Cheng et al. | |
| 5,275,796 | A * | 1/1994 | Tillotson | C01B 33/1585 423/338 |
| 5,306,555 | A | 4/1994 | Ramamurthi et al. | |
| 5,565,142 | A * | 10/1996 | Deshpande | C01B 33/163 252/62 |
| 5,587,107 | A * | 12/1996 | Schwertfeger | B01J 20/20 252/587 |
| 5,786,059 | A * | 7/1998 | Frank | D04H 1/413 428/68 |
| 5,789,075 | A * | 8/1998 | Frank | B01J 13/0091 428/312.6 |
| 5,830,387 | A * | 11/1998 | Yokogawa | C01B 33/1585 252/62 |
| 5,858,489 | A | 1/1999 | Beauquin | |
| 5,866,027 | A * | 2/1999 | Frank | B01J 13/0091 252/62 |
| 5,911,658 | A * | 6/1999 | Yoldas | C01B 33/1585 252/62 |
| 5,962,539 | A * | 10/1999 | Perrut | C08J 9/28 521/97 |
| 5,972,254 | A | 10/1999 | Sander | |
| 5,973,015 | A * | 10/1999 | Coronado | B01J 13/0091 521/103 |
| 6,068,882 | A * | 5/2000 | Ryu | C04B 14/302 427/246 |
| 6,080,475 | A * | 6/2000 | Frank | C04B 14/062 428/331 |
| 6,083,619 | A * | 7/2000 | Frank | C04B 14/064 428/331 |
| 6,087,407 | A | 7/2000 | Coronado et al. | |
| 6,140,377 | A * | 10/2000 | Schwertfeger | C01B 33/1585 252/62 |
| 6,187,250 | B1 * | 2/2001 | Champagne | B29C 39/16 204/470 |
| 6,197,270 | B1 * | 3/2001 | Sonoda | C01B 33/1585 423/338 |
| 6,316,050 | B1 * | 11/2001 | Troll | B82Y 30/00 427/213 |
| 6,479,416 | B1 * | 11/2002 | Frank | C04B 30/02 442/417 |
| 6,620,355 | B1 * | 9/2003 | Schmidt | B01J 2/20 264/102 |
| 6,656,527 | B1 * | 12/2003 | Gessner | C01B 33/1585 427/246 |
| 6,670,402 | B1 * | 12/2003 | Lee | C01B 33/1585 516/111 |
| 6,787,191 | B2 | 9/2004 | Hanahata et al. | |
| 6,887,563 | B2 * | 5/2005 | Frank | C04B 28/26 428/312.6 |
| 6,989,123 | B2 * | 1/2006 | Lee | B29C 39/14 264/299 |
| 7,078,359 | B2 * | 7/2006 | Stepanian | C03C 13/00 442/59 |
| 7,216,509 | B2 * | 5/2007 | Costa | C03C 1/006 65/17.2 |
| 7,399,439 | B2 | 7/2008 | Lee et al. | |
| 7,470,725 | B2 | 12/2008 | Schwertfeger et al. | |
| 7,504,346 | B2 | 3/2009 | Stepanian et al. | |
| 7,780,890 | B2 | 8/2010 | Lee et al. | |
| 8,214,980 | B2 * | 7/2012 | Bullock | B32B 5/245 28/107 |
| 8,293,834 | B2 * | 10/2012 | Meyer | C09C 1/3018 524/588 |
| 8,470,443 | B2 * | 6/2013 | Gottschalk-Gaudig | C09C 1/3081 428/405 |
| 9,777,126 | B2 | 10/2017 | Williams et al. | |
| 10,253,159 | B2 * | 4/2019 | Evans | C08K 3/34 |
| 2005/0192366 | A1 | 9/2005 | Ou et al. | |
| 2006/0178496 | A1 * | 8/2006 | Lin | C01B 33/1585 528/39 |
| 2007/0152363 | A1 * | 7/2007 | Begag | B01F 15/0201 264/41 |
| 2012/0025127 | A1 * | 2/2012 | Yeo | C01B 33/155 252/62 |
| 2012/0097907 | A1 * | 4/2012 | Bauer | C04B 14/302 252/602 |
| 2012/0175546 | A1 * | 7/2012 | Dong | C08G 73/106 252/62 |
| 2013/0196137 | A1 * | 8/2013 | Evans | B32B 19/06 428/292.1 |
| 2016/0115685 | A1 | 4/2016 | Bonnardel et al. | |
| 2016/0333572 | A1 | 11/2016 | Samanta et al. | |
| 2017/0154379 | A1 | 6/2017 | Inan | |
| 2019/0374921 | A1 * | 12/2019 | Mihalcik | C08G 77/02 |

FOREIGN PATENT DOCUMENTS

| | | |
|---|---|---|
| CL | 199701123 | 10/1997 |
| CN | 102225769 A | 10/2011 |
| CN | 101948297 B | 2/2013 |
| EP | 0775669 A2 | 5/1997 |
| JP | 0834678 A | 2/1996 |
| JP | 3339394 B2 | 10/2002 |
| RU | 2164994 C2 | 4/2001 |
| SU | 1680623 A1 | 9/1991 |

OTHER PUBLICATIONS

Aravind et al., Porous silicon oxycarbide glasses from hybrid ambigels, Micorporous and Mesoporous Materials. 142, (2011) 511-517.

Dire et al., Preparation of Dense and Porous Silicon Oxycarbide Submircometer-Sized Spheres Using a Modified Stober Process, J. Am. Ceram. Soc., 94 [11], 3819-3824, (2011).

Hatton et al., Materials chemistry for low-k materials, Materials Today, (Mar. 2006), vol. 9, No. 3, p. 22-31.

Kamiya et al., Preparation of Silicon Oxycarbide Glass Fibers by Sol-Gel Method—Effect of Starting Sol Composition on Tensile Strength of Fibers, Journal of Sol-Gel Sciene and Technology, 14, 95-102 (1999).

Kang et al. Synthesis of low-density silica gel at ambient pressure: Effect of heat treatment, J. Mat. Sci. 35, (2000), 4971-4976.

Liu et al., Influence of thermal process on microstructural and physical properties of ambient pressure dried nydrophobic silica aerogel monoliths, J Sol-Gel Sci Technol, (2012), 62:126-133.

Pantano et al., Silicon Oxycarbide Glasses, Journal of Sol-Gel Science and Technology, 14 7-25 (1999).

Parale et al., Wettability study of surface modified silica aerogels with different silylating agents, J Sol-Gel Sci Technol, (2012), 63:573-579.

Rao et al., Comparative studies of the physical and hydrophobic properties of TEOS based silica aerogels using different co-precursors, Science and Technology of Advanced Materials, 4, (2003), 509-515.

(56) References Cited

OTHER PUBLICATIONS

Rao et al., Hydrophobic and physical properties of the ambient pressure dried silica aerogels with sodium silicate precursor using various surface modification agents, Applied Surface Science, 253, (2007), 6032-6040.

Rao et al., Hydrophobicity and physical properties of TEOS based silica aerogels using phenyltriethoxysilane as a synthesis component, J Mat. Scie., 38, (2003), 4407-4413.

Rao et al., Organic Surface Modfication of TEOS Based Silica Aerogels Synthesized by Co-Precursor and Derivatization Methods, Journal of Sol-Gel Science and Technology, 30, 141-147, 2004.

Rao et al., Preparation and characterization of hydrophobic silica aerogels Materials Chemistry and Physics, 53, (1998), 13-18.

Rao et al., Surface chemical modification of silica aerogels using various alkyl-alkoxy/chloro silanes, Applied Surface Science, 206, (2003), 262-270.

Rao et al., Surface chemical modification of TEOS based silica aerogels synthesized by two step (acid-base) sol-gel process. Applied Surface Science, 252, (2006), 4289-4297.

Sarawade et al., Synthesis of sodium silicate-based hydrophilic silica aerogel beads with superior properties: Effect of heat-treatment, Journal of Non-Crystalline Solids, 357, (2011), 2156-2162.

Severin et al., Thermal Stability and Degradation Mechanisms of Trialkylsilyl Surface Modifications on Silica Powder, Surface and Interface Analysis, vol. 19, 133-138 (1992).

Singh et al., Surface Chemistry and Structure of Silicon Oxycarbide Gels and Glasses, Journal of Sol-Gel Science and Technology, 8, 371-376, (1997).

Soraru et al., Mechanical Characterizarion of Sol-Gel-Dervived Silicon Oxycarbide Glasses, J. Am. Cerma. Soc., 79 (8), 2074-80, (1996).

Suyal et al., A solid state 29Si and 13C NMR study on the synthesis of thin silicon-oxycarbide glass sheets by a sol-get route, J. Mater. Chem., 1999, 9, 3061-3067.

Zhou et al., Surface Modification of Silica Aerogels with Trimethylchlorosilane in the Ambient Pressure Drying, Inorganic Materials, 2008, vol. 44, No. 9, pp. 976-979.

Zhuravlev et al., Concentration of Hydroxyl Groups on the Surface of Amorphous Silicas, Langmuir, 1987, 3, 316-318.

Zhuravlev et al. The surface chemistry of amorphous silica: Zhuravlev model, Colloids and Surfaces A: Physicochemical and Engineering Aspects, 173, (2000), 1-38.

Ingale et al., Physico-chemical properties of silica aerogels prepared from TMOS/MTMS mixtures, J. of Porous Mats., Kluwer Academic Publishers, Bo, vol. 18, No. 5, Sep. 4, 2010, pp. 567-572.

Sun-Wook, et al., Porous silica aerogels/honeycomb ceramic composites fabricated by an ultrasonic stimulation process, Metals and Materials, vol. 18, No. 3, Jun. 1, 2012, pp. 481-486.

* cited by examiner

HYDROPHOBIC AEROGEL MATERIALS

CROSS-REFERENCE TO RELATED APPLICATIONS

This nonprovisional application is a continuation of U.S. Nonprovisional patent application Ser. No. 15/835,005, entitled "Hydrophobic Aerogel Materials", filed Dec. 7, 2017; U.S. Nonprovisional patent application Ser. No. 15/835,136, entitled "Hydrophobic Aerogel Materials", filed Dec. 7, 2017, now U.S. Pat. No. 10,233,302; U.S. Nonprovisional patent application Ser. No. 15/835,190, entitled "Hydrophobic Aerogel Materials", filed Dec. 7, 2017, now U.S. Pat. No. 10,227,472; U.S. Nonprovisional patent application Ser. No. 15/835,258, entitled "Hydrophobic Aerogel Materials", filed Dec. 7, 2017, now U.S. Pat. No. 10,233,303; each of which is a continuation of U.S. Nonprovisional patent application Ser. No. 14/873,753, entitled "Hydrophobic Aerogel Materials", filed Oct. 2, 2015, now U.S. Pat. No. 9,868,843; which claims priority to U.S. Provisional Application No. 62/059,555, entitled "Hydrophobic Aerogel Materials", filed Oct. 3, 2014 and to U.S. Provisional Application No. 62/118,864, entitled "Hydrophobic Aerogel Materials", filed Feb. 20, 2015 and to U.S. Provisional Application No. 62/232,945, entitled "Hydrophobic Aerogel Materials", filed Sep. 25, 2015; each of which is incorporated herein by reference in its entirety.

BACKGROUND

Low-density aerogel materials are widely considered to be the best solid insulators available. Aerogels function as insulators primarily by minimizing conduction (low structural density results in tortuous path for energy transfer through the solid framework), convection (large pore volumes and very small pore sizes result in minimal convection), and radiation (IR absorbing or scattering dopants are readily dispersed throughout the aerogel matrix). Aerogels can be used in a broad range of applications, including: heating and cooling insulation, acoustics insulation, electronic dielectrics, aerospace, energy storage and production, and filtration. Furthermore, aerogel materials display many other interesting acoustic, optical, mechanical, and chemical properties that make them abundantly useful in various insulation and non-insulation applications.

SUMMARY

In one general aspect, the present disclosure can provide aerogel compositions which are durable and easy to handle, which have favorable performance in aqueous environments, and which also have favorable combustion and self-heating properties. In certain embodiments, the present disclosure presents aerogel compositions which are reinforced aerogel compositions that are flexible, resilient, and self-supporting, which have favorable performance in aqueous environments, and which also have favorable combustion and self-heating properties.

In another general aspect, the present disclosure can provide aerogel compositions comprising a silica-based framework, and which have the following properties: a) a density of 0.60 g/cm$^3$ or less; b) a thermal conductivity of 50 mW/m*K or less; and c) a liquid water uptake of 40 wt % or less. In certain embodiments, aerogel compositions of the present disclosure have a heat of combustion of less than 717 cal/g. In certain embodiments, aerogel compositions of the present disclosure have an onset of thermal decomposition of hydrophobic organic material temperature of between 300° C. and 700° C. In certain embodiments, aerogel compositions of the present disclosure have a density of 0.50 g/cm3 or less, 0.40 g/cm3 or less, 0.30 g/cm3 or less, 0.25 g/cm3 or less, or 0.20 g/cm3 or less. In certain embodiments, aerogel compositions of the present disclosure have a thermal conductivity of 45 mW/M*K or less, 40 mW/M*K or less, 35 mW/M*K or less, 30 mW/M*K or less, 25 mW/M*K or less, 20 mW/M*K or less, or a thermal conductivity between 5 mW/M*K and 50 mW/M*K. In certain embodiments, aerogel compositions of the present disclosure have a liquid water uptake of 35 wt % or less, 30 wt % or less, 25 wt % or less, 20 wt % or less, 15 wt % or less, or 10 wt % or less. In certain embodiments, aerogel compositions of the present disclosure have a heat of combustion of 650 cal/g or less, 600 cal/g or less, 550 cal/g or less, 500 cal/g or less, 450 cal/g or less, 400 cal/g or less, or a heat of combustion between 250 cal/g and 717 cal/g. In certain embodiments, aerogel compositions of the present disclosure have an onset of thermal decomposition of hydrophobic organic material temperature of 400° C. or higher, 450° C. or higher, 475° C. or higher, 500° C. or higher, 525° C. or higher, 550° C. or higher, 575° C. or higher, 600° C. or higher, or an onset of thermal decomposition temperature between 400° C. and 700° C. In a preferred embodiment, aerogel compositions of the present disclosure have the following properties: a) a density of 0.40 g/cm$^3$ or less; b) a thermal conductivity of 40 mW/m*K or less; c) a liquid water uptake of 40 wt % or less; d) a heat of combustion between 140 cal/g and 600 cal/g; and e) an onset of thermal decomposition temperature of between 525° C. and 700° C. In certain embodiments, aerogel compositions of the present disclosure have a ratio of $T^{1-2}$-$T^3$ silica species of between about 0.01 and 0.5, and/or a ratio of $Q^{2-3}$:$Q^4$ silica species of between about 0.1 and 1.5. In a certain embodiments, aerogel compositions of the present disclosure are reinforced aerogel composition, fiber-reinforced aerogel compositions, or aerogel blanket compositions. In certain embodiments, aerogel compositions of the present disclosure have a hydrophobic organic content between about 1 wt % and about 30 wt %, between about 1 wt % and about 25 wt %, between about 1 wt % and about 20 wt %, between about 1 wt % and about 15 wt %, between about 1 wt % and about 10 wt %, or between about 1 wt % and about 5 wt %.

In another general aspect, the presents disclosure can provide a method of preparing an aerogel composition, comprising: a) providing a precursor solution comprising silica gel precursor materials, a solvent, and optionally a catalyst; b) allowing the silica gel precursor materials in the precursor solution to transition into a gel material or composition; c) extracting at least a portion of the solvent from the gel material or composition to obtain an aerogel material or composition; d) incorporating at least one hydrophobic-bound silicon into the aerogel material or composition by one or both of: i) including in the precursor solution at least one silica gel precursor material having at least one hydrophobic group, or ii) exposing the precursor solution, gel composition, or aerogel composition to a hydrophobizing agent; and e) heat treating the aerogel material or composition by exposing the aerogel material or composition to a reduced oxygen atmosphere at a temperature above 300° C. In certain embodiments, methods of the present disclosure include exposing the aerogel composition to a reduced oxygen atmosphere at temperatures between 300° C. and 650° C. for a period of time between about 30 seconds and about 200 minutes to obtain a treated aerogel composition. In certain embodiments, methods of the present disclosure include incorporating a reinforcement material into the aerogel composition by combining the reinforcement material with the precursor solution either before or during the transition of the silica gel precursor materials in the precursor solution into the gel composition. In a preferred embodiment, the reinforcement material comprises a continuous sheet of fiber reinforcement material. In certain embodiments, methods of the present disclosure include the temperature exposure of the heat treatment of the aerogel composition being limited to a temperature below 850° C. In certain embodiments, methods of the present disclosure include the total time period for transitioning the at least one gel precursor in the precursor solution into a gel material being within a period of 30 hours or less. In certain embodiments, methods of the present disclosure include the reduced oxygen atmosphere comprising 0.1% to 5% oxygen by volume. In certain embodiments, methods of the present disclosure include the step of incorporating at least one hydrophobic-bound silicon into the aerogel composition providing a hydrophobic organic content in the aerogel composition of between about 1 wt % and about 25 wt %. In a preferred embodiment, methods of the present disclosure produce an aerogel composition. In certain embodiments, methods of the present disclosure produce an aerogel composition which has the following properties: a) a density of 0.60 g/cm$^3$ or less; b) a thermal conductivity of 50 mW/m*K or less; c) a liquid water uptake of 40 wt % or less; d) a heat of combustion between 150 cal/g and 717 cal/g; and e) an onset of thermal decomposition of hydrophobic organic material temperature of between 300° C. and 700° C.

In another general aspect, the disclosure can provide a method of preparing an aerogel composition, comprising: a) producing a first aerogel composition comprising at least one hydrophobic-bound silicon; and b) exposing the first aerogel composition to a reduced oxygen atmosphere at a temperature above 300° C. In another general aspect, the disclosure can provide a method comprising exposing a first aerogel composition comprising at least one hydrophobic-bound silicon to a reduced oxygen atmosphere at a temperature above 300° C. to obtain a second aerogel composition. In certain embodiments, methods of the present disclosure include exposing the aerogel material or composition to a reduced oxygen atmosphere at temperatures between 300° C. and 650° C. for a period of time between about 30 seconds and about 200 minutes to obtain a treated aerogel material or composition. In certain embodiments, methods of the present disclosure include the temperature exposure of the heat treatment of the aerogel material or composition being limited to a temperature below 850° C. In certain embodiments, methods of the present disclosure include aerogel compositions which are a silica-based aerogel materials. In certain embodiments, methods of the present disclosure include aerogel compositions which are reinforced aerogel composition. In certain embodiments, methods of the present disclosure include reduced oxygen atmospheres comprising 0.1% to 5% oxygen by volume. In certain embodiments, methods of the present disclosure include aerogel compositions which have a hydrophobic organic content between about 1 wt % and about 25 wt %. In certain embodiments, methods of the present disclosure produce treated aerogel compositions which have improved hydrophobicity relative to the aerogel compositions prior to the treatment method. In certain embodiments, methods of the present disclosure produce treated aerogel compositions which have a lower liquid water uptake relative to the aerogel compositions prior to the treatment method. In certain embodiments, methods of the present disclosure produce treated aerogel compositions which have a lower heat of combustion relative to the aerogel compositions prior to the treatment method. In certain embodiments, methods of the present disclosure produce treated aerogel compositions which have a higher onset of thermal decomposition temperature relative to the aerogel compositions prior to the treatment method.

DETAILED DESCRIPTION OF THE PREFERRED EMBODIMENT

Figure 1:
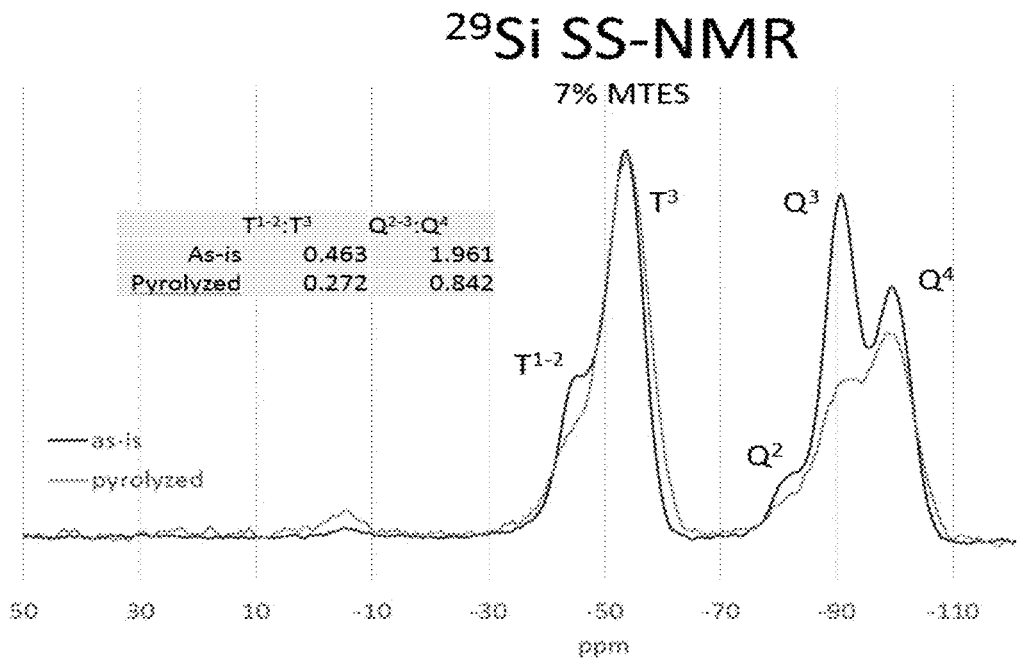
FIG. 1 is a $^{29}$Si Solid State NMR spectrum for examples of aerogel compositions of the present disclosure.

Aerogels are a class of porous materials with open-cells comprising a framework of interconnected structures, with a corresponding network of pores integrated within the framework, and an interstitial phase within the network of pores which is primarily comprised of gases such as air. Aerogels are typically characterized by a low density, a high porosity, a large surface area, and small pore sizes. Aerogels can be distinguished from other porous materials by their physical and structural properties.

Within the context of the present disclosure, the term "aerogel" or "aerogel material" refers to a gel comprising a framework of interconnected structures, with a corresponding network of interconnected pores integrated within the framework, and containing gases such as air as a dispersed interstitial medium; and which is characterized by the following physical and structural properties (according to Nitrogen Porosimetry Testing) attributable to aerogels: (a) an average pore diameter ranging from about 2 nm to about 100 nm, (b) a porosity of at least 80% or more, and (c) a surface area of about 20 m$^2$/g or more.

Aerogel materials of the present disclosure thus include any aerogels or other open-celled compounds which satisfy the defining elements set forth in previous paragraphs; including compounds which can be otherwise categorized as xerogels, cryogels, ambigels, microporous materials, and the like.

Aerogel materials may also be further characterized by additional physical properties, including: (d) a pore volume of about 2.0 mL/g or more, preferably about 3.0 mL/g or more; (e) a density of about 0.50 g/cc or less, preferably about 0.25 g/cc or less; and (f) at least 50% of the total pore volume comprising pores having a pore diameter of between 2 and 50 nm; though satisfaction of these additional properties is not required for the characterization of a compound as an aerogel material.

Within the context of the present disclosure, the term "innovative processing and extraction techniques" refers to methods of replacing a liquid interstitial phase in a wet-gel material with a gas such as air, in a manner which causes low pore collapse and low shrinkage to the framework structure of the gel. Drying techniques, such as ambient pressure evaporation, often introduce strong capillary pressures and other mass transfer limitations at the liquid-vapor interface of the interstitial phase being evaporated or removed. The strong capillary forces generated by liquid evaporation or removal can cause significant pore shrinkage and framework collapse within the gel material. The use of innovative processing and extraction techniques during the extraction of a liquid interstitial phase reduces the negative effects of capillary forces on the pores and the framework of a gel during liquid phase extraction.

In certain embodiments, an innovative processing and extraction technique uses near critical or super critical fluids, or near critical or super critical conditions, to extract the liquid interstitial phase from a wet-gel material. This can be accomplished by removing the liquid interstitial phase from the gel near or above the critical point of the liquid or mixture of liquids. Co-solvents and solvent exchanges can be used to optimize the near critical or super critical fluid extraction process.

In certain embodiments, an innovative processing and extraction technique includes the modification of the gel framework to reduce the irreversible effects of capillary pressures and other mass transfer limitations at the liquid-vapor interface. This embodiment can include the treatment of a gel framework with a hydrophobizing agent, or other functionalizing agents, which allow a gel framework to withstand or recover from any collapsing forces during liquid phase extraction conducted below the critical point of the liquid interstitial phase. This embodiment can also include the incorporation of functional groups or framework elements which provide a framework modulus which is sufficiently high to withstand or recover from collapsing forces during liquid phase extraction conducted below the critical point of the liquid interstitial phase.

Within the context of the present disclosure, the terms "framework" or "framework structure" refer to the network of interconnected oligomers, polymers or colloidal particles that form the solid structure of a gel or an aerogel. The polymers or particles that make up the framework structures typically have a diameter of about 100 angstroms. However, framework structures of the present disclosure can also include networks of interconnected oligomers, polymers or colloidal particles of all diameter sizes that form the solid structure within in a gel or aerogel. Furthermore, the terms "silica-based aerogel" or "silica-based framework" refer to an aerogel framework in which silica comprises at least 50% (by weight) of the oligomers, polymers or colloidal particles that form the solid framework structure within in the gel or aerogel.

Within the context of the present disclosure, the term "aerogel composition" refers to any composite material which includes aerogel material as a component of the composite. Examples of aerogel compositions include, but are not limited to: fiber-reinforced aerogel composites; aerogel composites which include additive elements such as opacifiers; aerogel-foam composites; aerogel-polymer composites; and composite materials which incorporate aerogel particulates, particles, granules, beads, or powders into a solid or semi-solid material, such as binders, resins, cements, foams, polymers, or similar solid materials.

Within the context of the present invention, the term "monolithic" refers to aerogel materials in which a majority (by weight) of the aerogel included in the aerogel material or composition is in the form of a unitary interconnected aerogel nanostructure. Monolithic aerogel materials include aerogel materials which are initially formed to have a unitary interconnected gel or aerogel nanostructure, but which are subsequently cracked, fractured or segmented into non-unitary aerogel nanostructures. Monolithic aerogel materials are differentiated from particulate aerogel materials. The term "particulate aerogel material" refers to aerogel materials in which a majority (by weight) of the aerogel included in the aerogel material is in the form of particulates, particles, granules, beads, or powders, which can be combined or compressed together but which lack an interconnected aerogel nanostructure between individual particles.

Within the context of the present disclosure, the term "reinforced aerogel composition" refers to aerogel compositions which comprise a reinforcing phase within the aerogel material which is not part of the aerogel framework. The reinforcing phase can be any material which provides increased flexibility, resilience, conformability or structural stability to the aerogel material. Examples of well-known reinforcing materials include, but are not limited to: open-cell foam reinforcement materials, closed-cell foam reinforcement materials, open-cell membranes, honeycomb reinforcement materials, polymeric reinforcement materials, and fiber reinforcement materials such as discrete fibers, woven materials, non-woven materials, battings, webs, mats, and felts. Additionally, fiber based reinforcements may be combined with one or more of the other reinforcing materials, and can be oriented continuously throughout or in limited preferred parts of the composition.

Within the context of the present disclosure, the term "fiber-reinforced aerogel composition" refers to a reinforced aerogel composition which comprises a fiber reinforcement material as a reinforcing phase. Examples of fiber reinforcement materials include, but are not limited to, discrete fibers, woven materials, non-woven materials, battings, webs, mats, felts, or combinations thereof. Fiber reinforcement materials can comprise a range of materials, including, but not limited to: Polyesters, polyolefin terephthalates, poly (ethylene) naphthalate, polycarbonates (examples Rayon, Nylon), cotton, (e.g. lycra manufactured by DuPont), carbon (e.g. graphite), polyacrylonitriles (PAN), oxidized PAN, uncarbonized heat treated PANs (such as those manufactured by SGL carbon), fiberglass based material (like S-glass, 901 glass, 902 glass, 475 glass, E-glass) silica based fibers like quartz, (e.g. Quartzel manufactured by Saint-Gobain), Q-felt (manufactured by Johns Manville), Saffil (manufactured by Saffil), Durablanket (manufactured by Unifrax) and other silica fibers, Duraback (manufactured by Carborundum), Polyaramid fibers like Kevlar, Nomex, Sontera (all manufactured by DuPont), Conex (manufactured by Taijin), polyolefins like Tyvek (manufactured by DuPont), Dyneema (manufactured by DSM), Spectra (manufactured by Honeywell), other polypropylene fibers like Typar, Xavan (both manufactured by DuPont), fluoropolymers like PTFE with trade names as Teflon (manufactured by DuPont), Goretex (manufactured by W.L. GORE), Silicon carbide fibers like Nicalon (manufactured by COI Ceramics), ceramic fibers like Nextel (manufactured by 3M), Acrylic polymers, fibers of wool, silk, hemp, leather, suede, PBO-Zylon fibers (manufactured by Tyobo), Liquid crystal material like Vectan (manufactured by Hoechst), Cambrelle fiber (manufactured by DuPont), Polyurethanes, polyamides, Wood fibers, Boron, Aluminum, Iron, Stainless Steel fibers and other thermoplastics like PEEK, PES, PEI, PEK, PPS.

Within the context of the present disclosure, the terms "aerogel blanket" or "aerogel blanket composition" refer to aerogel compositions reinforced with a continuous sheet of reinforcement material. Aerogel blanket compositions can be differentiated from other reinforced aerogel composition which are reinforced with a non-continuous fiber or foam network, such as separated agglomerates or clumps of fiber materials. Aerogel blanket compositions are particularly useful for applications requiring flexibility, since they are highly conformable and can be used like a blanket to cover surfaces of simple or complex geometry, while also retaining the excellent thermal insulation properties of aerogels. Aerogel blanket compositions and similar fiber-reinforced aerogel compositions are described in Published US patent application 2002/0094426 (paragraphs 12-16, 25-27, 38-58, 60-88), which is hereby incorporated by reference according to the individually cited sections and paragraphs.

Within the context of the present disclosure, the term "wet gel" refers to a gel in which the mobile interstitial phase within the network of interconnected pores is primarily comprised of a liquid phase such as a conventional solvent, liquefied gases such as liquid carbon dioxide, or a combination thereof. Aerogels typically require the initial production of a wet gel, followed by innovative processing and extraction to replace the mobile interstitial liquid phase in the gel with air. Examples of wet gels include, but are not limited to: alcogels, hydrogels, ketogels, carbonogels, and any other wet gels known to those in the art.

Within the context of the present disclosure, the terms "additive" or "additive element" refer to materials which can be added to an aerogel composition before, during, or after the production of the aerogel. Additives can be added to alter or improve desirable properties in an aerogel, or to counteract undesirable properties in an aerogel. Additives are typically added to an aerogel material either prior or during gelation. Examples of additives include, but are not limited to: microfibers, fillers, reinforcing agents, stabilizers, thickeners, elastic compounds, opacifiers, coloring or pigmentation compounds, radiation absorbing compounds, radiation reflecting compounds, corrosion inhibitors, thermally conductive components, phase change materials, pH adjustors, redox adjustors, HCN mitigators, off-gas mitigators, electrically conductive compounds, electrically dielectric compounds, magnetic compounds, radar blocking components, hardeners, anti-shrinking agents, and other aerogel additives known to those in the art. Other examples of additives include smoke suppressants and fire suppressants. Published US Pat. App. 20070272902 A1 (Paragraphs [0008] and [0010]-[0039]) includes teachings of smoke suppressants and fire suppressants, and is hereby incorporated by reference according to the individually cited paragraphs.

Within the context of the present disclosure, the terms "flexible" and "flexibility" refer to the ability of an aerogel material or composition to be bent or flexed without macrostructural failure. Preferably, aerogel compositions of the present disclosure are capable of bending at least 5°, at least 25°, at least 45°, at least 65°, or at least 85° without macroscopic failure; and/or have a bending radius of less than 4 feet, less than 2 feet, less than 1 foot, less than 6 inches, less than 3 inches, less than 2 inches, less than 1 inch, or less than ½ inch without macroscopic failure. Likewise, the terms "highly flexible" or "high flexibility" refer to aerogel materials or compositions capable of bending to at least 90° and/or have a bending radius of less than ½ inch without macroscopic failure. Furthermore, the terms "classified flexible" and "classified as flexible" refer to aerogel materials or compositions which can be classified as flexible according to ASTM classification standard C1101 (ASTM International, West Conshohocken, Pa.).

Aerogel materials or compositions of the present disclosure can be flexible, highly flexible, and/or classified flexible. Aerogel materials or compositions of the present disclosure can also be drapable. Within the context of the present disclosure, the terms "drapable" and "drapability" refer to the ability of an aerogel material or composition to be bent or flexed to 90° or more with a radius of curvature of about 4 inches or less, without macroscopic failure. An aerogel material or composition of the present disclosure is preferably flexible such that the composition is non-rigid and may be applied and conformed to three-dimensional surfaces or objects, or pre-formed into a variety of shapes and configurations to simplify installation or application.

Within the context of the present disclosure, the terms "resilient" and "resilience" refer to the ability of an aerogel material or composition to at least partially return to an original form or dimension following deformation through compression, flexing, or bending. Resilience may be complete or partial, and it may be expressed in terms of percentage return. An aerogel material or composition of the present disclosure preferably has a resilience of more than 25%, more than 50%, more than 60%, more than 70%, more than 75%, more than 80%, more than 85%, more than 90%, or more than 95% return to an original form or dimension following a deformation. Likewise, the terms "classified resilient" and "classified as resilient" refer to aerogel materials or compositions of the present disclosure which can be classified as resilient flexible according to ASTM classification standard C1101 (ASTM International, West Conshohocken, Pa.).

Within the context of the present disclosure, the term "self-supporting" refers to the ability of an aerogel material or composition to be flexible and/or resilient based primarily on the physical properties of the aerogel and any reinforcing phase in the aerogel composition. Self-supporting aerogel materials or compositions of the present disclosure can be differentiated from other aerogel materials, such as coatings, which rely on an underlying substrate to provide flexibility and/or resilience to the material.

Within the context of the present disclosure, the term "shrinkage" refers to the ratio of: 1) the difference between the measured final density of the dried aerogel material or composition and the target density calculated from solid content in the sol-gel precursor solution, relative to 2) the target density calculated from solid content in the sol-gel precursor solution. Shrinkage can be calculated by the following equation: Shrinkage=[Final Density $(g/cm^3)$–Target Density $(g/cm^3)$]/[Target Density $(g/cm^3)$]. Preferably, shrinkage of an aerogel material of the present disclosure is preferably 50% or less, 25% or less, 10% or less, 8% or less, 6% or less, 5% or less, 4% or less, 3% or less, 2% or less, 1% or less, 0.1% or less, about 0.01% or less, or in a range between any two of these values.

Within the context of the present disclosure, the terms "thermal conductivity" and "TC" refer to a measurement of the ability of a material or composition to transfer heat between two surfaces on either side of the material or composition, with a temperature difference between the two surfaces. Thermal conductivity is specifically measured as the heat energy transferred per unit time and per unit surface area, divided by the temperature difference. It is typically recorded in SI units as mW/m*K (milliwatts per meter*Kelvin). The thermal conductivity of a material may be determined by methods known in the art, including, but not limited to: Test Method for Steady-State Thermal Transmission Properties by Means of the Heat Flow Meter Apparatus (ASTM C518, ASTM International, West Conshohocken, Pa.); a Test Method for Steady-State Heat Flux Measurements and Thermal Transmission Properties by Means of the Guarded-Hot-Plate Apparatus (ASTM C177, ASTM International, West Conshohocken, Pa.); a Test Method for Steady-State Heat Transfer Properties of Pipe Insulation (ASTM C335, ASTM International, West Conshohocken, Pa.); a Thin Heater Thermal Conductivity Test (ASTM C1114, ASTM International, West Conshohocken, Pa.); Determination of thermal resistance by means of guarded hot plate and heat flow meter methods (EN 12667, British Standards Institution, United Kingdom); or Determination of steady-state thermal resistance and related properties—Guarded hot plate apparatus (ISO 8203, International Organization for Standardization, Switzerland). Within the context of the present disclosure, thermal conductivity measurements are acquired according to ASTM C177 standards, at a temperature of about 37.5° C. at atmospheric pressure, and a compression of about 2 psi, unless otherwise stated. Preferably, aerogel materials or compositions of the present disclosure have a thermal conductivity of about 50 mW/mK or less, about 40 mW/mK or less, about 30 mW/mK or less, about 25 mW/mK or less, about 20 mW/mK or less, about 18 mW/mK or less, about 16 mW/mK or less, about 14 mW/mK or less, about 12 mW/mK or less, about 10 mW/mK or less, about 5 mW/mK or less, or in a range between any two of these values.

Within the context of the present disclosure, the term "density" refers to a measurement of the mass per unit volume of an aerogel material or composition. The term "density" generally refers to the true density of an aerogel material, as well as the bulk density of an aerogel composition. Density is typically recorded as $kg/m^3$ or g/cc. The density of an aerogel material or composition may be determined by methods known in the art, including, but not limited to: Standard Test Method for Dimensions and Density of Preformed Block and Board-Type Thermal Insulation (ASTM C303, ASTM International, West Conshohocken, Pa.); Standard Test Methods for Thickness and Density of Blanket or Batt Thermal Insulations (ASTM C167, ASTM International, West Conshohocken, Pa.); or Determination of the apparent density of preformed pipe insulation (ISO 18098, International Organization for Standardization, Switzerland). Within the context of the present disclosure, density measurements are acquired according to ASTM C167 standards, unless otherwise stated. Preferably, aerogel materials or compositions of the present disclosure have a density of about 0.60 g/cc or less, about 0.50 g/cc or less, about 0.40 g/cc or less, about 0.30 g/cc or less, about 0.25 g/cc or less, about 0.20 g/cc or less, about 0.18 g/cc or less, about 0.16 g/cc or less, about 0.14 g/cc or less, about 0.12 g/cc or less, about 0.10 g/cc or less, about 0.05 g/cc or less, about 0.01 g/cc or less, or in a range between any two of these values.

Within the context of the present disclosure, the term "hydrophobicity" refers to a measurement of the ability of an aerogel material or composition to repel water.

Hydrophobicity of an aerogel material or composition can be expressed in terms of the liquid water uptake. Within the context of the present disclosure, the term "liquid water uptake" refers to a measurement of the potential of an aerogel material or composition to absorb or otherwise retain liquid water. Liquid water uptake can be expressed as a percent (by weight or by volume) of water which is absorbed or otherwise retained by an aerogel material or composition when exposed to liquid water under certain measurement conditions. The liquid water uptake of an aerogel material or composition may be determined by methods known in the art, including, but not limited to: Standard Test Method for Determining the Water Retention (Repellency) Characteristics of Fibrous Glass Insulation (ASTM C1511, ASTM International, West Conshohocken, Pa.); Standard Test Method for Water Absorption by Immersion of Thermal Insulation Materials (ASTM C1763, ASTM International, West Conshohocken, Pa.); Thermal insulating products for building applications: Determination of short term water absorption by partial immersion (EN 1609, British Standards Institution, United Kingdom). Within the context of the present disclosure, measurements of liquid water uptake are acquired according to ASTM C1511 standards, under ambient pressure and temperature, unless otherwise stated. Preferably, aerogel materials or compositions of the present disclosure can have a liquid water uptake of according to ASTM C1511 of about 100 wt % or less, about 80 wt % or less, about 60 wt % or less, about 50 wt % or less, about 40 wt % or less, about 30 wt % or less, about 20 wt % or less, about 15 wt % or less, about 10 wt % or less, about 8 wt % or less, about 3 wt % or less, about 2 wt % or less, about 1 wt % or less, about 0.1 wt % or less, or in a range between any two of these values. Aerogel materials or compositions of the present disclosure can have a liquid water uptake of according to ASTM C1763 of about 100 vol wt % or less, about 80 wt % or less, about 60 wt % or less, about 50 wt % or less, about 40 wt % or less, about 30 wt % or less, about 20 wt % or less, about 15 wt % or less, about 10 wt % or less, about 8 wt % or less, about 3 wt % or less, about 2 wt % or less, about 1 wt % or less, about 0.1 wt % or less, or in a range between any two of these values. An aerogel material or composition which has improved liquid water uptake relative to another aerogel material or composition will have a lower percentage of liquid water uptake/retention relative to the reference aerogel materials or compositions.

Hydrophobicity of an aerogel material or composition can be expressed in terms of the water vapor uptake. Within the context of the present disclosure, the term "water vapor uptake" refers to a measurement of the potential of an aerogel material or composition to absorb water vapor. Water vapor uptake can be expressed as a percent (by weight) of water which is absorbed or otherwise retained by an aerogel material or composition when exposed to water vapor under certain measurement conditions. The water vapor uptake of an aerogel material or composition may be determined by methods known in the art, including, but not limited to: Standard Test Method for Determining the Water Vapor Sorption of Unfaced Mineral Fiber Insulation (ASTM C1104, ASTM International, West Conshohocken, Pa.). Within the context of the present disclosure, measurements of water vapor uptake are acquired according to ASTM C1104 standards, under ambient pressure and temperature, unless otherwise stated. Preferably, aerogel materials or compositions of the present disclosure can have a water vapor uptake of about 50 wt % or less, about 40 wt % or less, about 30 wt % or less, about 20 wt % or less, about 15 wt % or less, about 10 wt % or less, about 8 wt % or less, about 3 wt % or less, about 2 wt % or less, about 1 wt % or less, about 0.1 wt % or less, or in a range between any two of these values. An aerogel material or composition which has improved water vapor uptake relative to another aerogel material or composition will have a lower percentage of water vapor uptake/retention relative to the reference aerogel materials or compositions.

Hydrophobicity of an aerogel material or composition can be expressed by measuring the equilibrium contact angle of a water droplet at the interface with the surface of the material. Aerogel materials or compositions of the present disclosure can have a water contact angle of about 90° or more, about 120° or more, about 130° or more, about 140° or more, about 150° or more, about 160° or more, about 170° or more, about 175° or more, or in a range between any two of these values.

Within the context of the present disclosure, the terms "heat of combustion" and "HOC" refer to a measurement of the amount of heat energy released in the combustion of an aerogel material or composition. Heat of combustion is typically recorded in calories of heat energy released per gram of aerogel material or composition (cal/g), or as megajoules of heat energy released per kilogram of aerogel material or composition (MJ/kg). The heat of combustion of a material or composition may be determined by methods known in the art, including, but not limited to: Reaction to fire tests for products—Determination of the gross heat of combustion (calorific value) (ISO 1716, International Organization for Standardization, Switzerland). Within the context of the present disclosure, heat of combustion measurements are acquired according to conditions comparable to ISO 1716 standards, unless otherwise stated. Preferably, aerogel compositions of the present disclosure can have a heat of combustion of about 750 cal/g or less, about 717 cal/g or less, about 700 cal/g or less, about 650 cal/g or less, about 600 cal/g or less, about 575 cal/g or less, about 550 cal/g or less, about 500 cal/g or less, about 450 cal/g or less, about 400 cal/g or less, about 350 cal/g or less, about 300 cal/g or less, about 250 cal/g or less, about 200 cal/g or less, about 150 cal/g or less, about 100 cal/g or less, about 50 cal/g or less, about 25 cal/g or less, about 10 cal/g or less, or in a range between any two of these values. An aerogel composition which has an improved heat of combustion relative to another aerogel composition will have a lower heat of combustion value, relative to the reference aerogel compositions.

Within the context of the present disclosure, the terms "onset of thermal decomposition of hydrophobic organic material", "onset of thermal decomposition" and "$T_d$" refer to a measurement of the lowest temperature of environmental heat at which rapid exothermic reactions from the decomposition of hydrophobic organic material appear within a material or composition. The onset of thermal decomposition of a material or composition may be measured using thermo-gravimetric analysis (TGA). The TGA curve of a material depicts the weight loss (% mass) of a material as it is exposed to an increase in surrounding temperature. The onset of thermal decomposition of a material can be correlated with the intersection point of the following tangent lines of the TGA curve: a line tangent to the base line of the TGA curve, and a line tangent to the TGA curve at the point of maximum slope during the rapid decomposition event related to the decomposition of hydrophobic organic material. Within the context of the present disclosure, measurements of the onset of thermal decomposition of hydrophobic organic material are acquired using TGA analysis as provided in this paragraph, unless otherwise stated.

The onset of thermal decomposition of a material may also be measured using differential scanning calorimetry (DSC) analysis. The DSC curve of a material depicts the heat energy (mW/mg) released by a material as it is exposed to a gradual increase in surrounding temperature. The onset of thermal decomposition temperature of a material can be correlated with the point in the DSC curve where the Δ mW/mg (change in the heat energy output) maximally increases, thus indicating exothermic heat production from the aerogel material. Within the context of the present disclosure, measurements of onset of thermal decomposition using DSC are acquired using a temperature ramp rate of 20° C./min or less, unless otherwise stated.

Preferably, aerogel materials or compositions of the present disclosure have an onset of thermal decomposition of about 100° C. or more, about 150° C. or more, about 200° C. or more, about 250° C. or more, about 300° C. or more, about 350° C. or more, about 400° C. or more, about 450° C. or more, about 500° C. or more, about 550° C. or more, about 600° C. or more, about 650° C. or more, about 700° C. or more, about 750° C. or more, about 800° C. or more, or in a range between any two of these values. An aerogel material or composition which has an improved onset of thermal decomposition relative to another aerogel material or composition will have a higher onset of thermal decomposition temperature relative to the reference aerogel material or composition.

Within the context of the present disclosure, the term "self-heating temperature" refers to a measurement of the lowest temperature of environmental heat at which exothermic reactions appear under specific measurement conditions within an insulation system, such as an insulation system comprising an aerogel material or composition. Within the context of the present disclosure, measurements of the self-heating temperature of an insulation system are measured according to the following procedure, unless otherwise specified: a) providing an insulation system which is geometrically cubic with a dimension of 20 mm on each side; b) placing a thermocouple measuring device at the center of the insulation system; and c) exposing the insulation system to a series of increasing temperatures until an self-heating exothermic event occurs, which is indicated by the temperature of the thermocouple measuring device exceeding the external exposure temperature of the sample by an amount significant enough to indicate a self-heating exothermic event within the insulation system. Preferably, aerogel materials or compositions of the present disclosure have a self-heating temperature of about 100° C. or more, about 150° C. or more, about 200° C. or more, about 250° C. or more, about 300° C. or more, about 350° C. or more, about 400° C. or more, about 450° C. or more, about 500° C. or more, about 550° C. or more, about 600° C. or more, about 650° C. or more, about 700° C. or more, about 750° C. or more, about 800° C. or more, or in a range between any two of these values. An aerogel material or composition which has an improved self-heating temperature relative to another aerogel material or composition will have a higher self-heating temperature relative to the reference aerogel material or composition.

Aerogels are described as a framework of interconnected structures which are most commonly comprised of interconnected oligomers, polymers or colloidal particles. An aerogel framework can be made from a range of precursor materials, including: inorganic precursor materials (such as precursors used in producing silica-based aerogels); organic precursor materials (such precursors used in producing carbon-based aerogels); hybrid inorganic/organic precursor materials; and combinations thereof. Within the context of the present disclosure, the term "amalgam aerogel" refers to an aerogel produced from a combination of two or more different gel precursors.

Inorganic aerogels are generally formed from metal oxide or metal alkoxide materials. The metal oxide or metal alkoxide materials can be based on oxides or alkoxides of any metal that can form oxides. Such metals include, but are not limited to: silicon, aluminum, titanium, zirconium, hafnium, yttrium, vanadium, cerium, and the like. Inorganic silica aerogels are traditionally made via the hydrolysis and condensation of silica-based alkoxides (such as tetraethoxylsilane), or via gelation of silicic acid or water glass. Other relevant inorganic precursor materials for silica based aerogel synthesis include, but are not limited to: metal silicates such as sodium silicate or potassium silicate, alkoxysilanes, partially hydrolyzed alkoxysilanes, tetraethoxylsilane (TEOS), partially hydrolyzed TEOS, condensed polymers of TEOS, tetramethoxylsilane (TMOS), partially hydrolyzed TMOS, condensed polymers of TMOS, tetra-n-propoxysilane, partially hydrolyzed and/or condensed polymers of tetra-n-propoxysilane, polyethyl silicates, partially hydrolyzed polyethysilicates, monomeric alkylalkoxy silanes, bis-trialkoxy alkyl or aryl silanes, polyhedral silsesquioxanes, or combinations thereof.

In certain embodiments of the present disclosure, pre-hydrolyzed TEOS, such as Silbond H-5 (SBH5, Silbond Corp), which is hydrolyzed with a water/silica ratio of about 1.9-2, may be used as commercially available or may be further hydrolyzed prior to incorporation into the gelling process. Partially hydrolyzed TEOS or TMOS, such as polyethysilicate (Silbond 40) or polymethylsilicate may also be used as commercially available or may be further hydrolyzed prior to incorporation into the gelling process.

Inorganic aerogels can also include gel precursors which comprise at least one hydrophobic group, such as alkyl metal alkoxides, cycloalkyl metal alkoxides, and aryl metal alkoxides, which can impart or improve certain properties in the gel such as stability and hydrophobicity. Inorganic silica aerogels can specifically include hydrophobic precursors such as alkylsilanes or arylsilanes. Hydrophobic gel precursors can be used as primary precursor materials to form the framework of a gel material. However, hydrophobic gel precursors are more commonly used as coprecursors in combination with simple metal alkoxides in the formation of amalgam aerogels. Hydrophobic inorganic precursor materials for silica based aerogel synthesis include, but are not limited to: trimethyl methoxysilane [TMS], dimethyl dimethoxysilane [DMS], methyl trimethoxysilane [MTMS], trimethyl ethoxysilane, dimethyl diethoxysilane [DMDS], methyl triethoxysilane [MTES], ethyl triethoxysilane [ETES], diethyl diethoxysilane, ethyl triethoxysilane, propyl trimethoxysilane, propyl triethoxysilane, phenyl trimethoxysilane, phenyl triethoxysilane [PhTES], hexamethyldisilazane and hexaethyldisilazane, and the like.

Aerogels may also be treated to impart or improve hydrophobicity. Hydrophobic treatment can be applied to a sol-gel solution, a wet-gel prior to liquid phase extraction, or to an aerogel subsequent to liquid phase extraction. Hydrophobic treatment is especially common in the production of metal oxide aerogels, such as silica aerogels. An example of a hydrophobic treatment of a gel is discussed below in greater detail, specifically in the context of treating a silica wet-gel. However, the specific examples and illustrations provided herein are not intended to limit the scope of the present disclosure to any specific type of hydrophobic treatment procedure or aerogel substrate. The present disclosure can include any gel or aerogel known to those in the art, as well as associated methods of hydrophobic treatment of the aerogels, in either wet-gel form or dried aerogel form.

Hydrophobic treatment is carried out by reacting a hydroxy moiety on a gel, such as a silanol group (Si—OH) present on a framework of a silica gel, with a functional group of a hydrophobizing agent. The resulting reaction converts the silanol group and the hydrophobizing agent into a hydrophobic group on the framework of the silica gel. The hydrophobizing agent compound can react with hydroxyl groups on the gel according the following reaction: $R_N MX_{4-N}$(hydrophobizing agent)+MOH (silanol)→MOMR$_N$ (hydrophobic group)+HX. Hydrophobic treatment can take place both on the outer macro-surface of a silica gel, as well as on the inner-pore surfaces within the porous network of a gel.

A gel can be immersed in a mixture of a hydrophobizing agent and an optional hydrophobic-treatment solvent in which the hydrophobizing agent is soluble, and which is also miscible with the gel solvent in the wet-gel. A wide range of hydrophobic-treatment solvents can be used, including solvents such as methanol, ethanol, isopropanol, xylene, toluene, benzene, dimethylformamide, and hexane. Hydrophobizing agents in liquid or gaseous form may also be directly contacted with the gel to impart hydrophobicity.

The hydrophobic treatment process can include nixing or agitation to help the hydrophobizing agent to permeate the wet-gel. The hydrophobic treatment process can also include varying other conditions such as temperature and pH to further enhance and optimize the treatment reactions. After the reaction is completed, the wet-gel is washed to remove unreacted compounds and reaction by-products.

Hydrophobizing agents for hydrophobic treatment of an aerogel are generally compounds of the formula: $R_N MX_{4-N}$; where M is the metal; R is a hydrophobic group such as $CH_3$, $CH_2CH_3$, $C_6H_6$, or similar hydrophobic alkyl, cycloalkyl, or aryl moieties; and X is a halogen, usually Cl. Specific examples of hydrophobizing agents include, but are not limited to: trimethylchlorosilane [TMCS], triethylchlorosilane [TECS], triphenylchlorosilane [TPCS], dimethylchlorosilane [DMCS], dimethyldichlorosilane [DMDCS], and the like. Hydrophobizing agents can also be of the formula: $Y(R_3M)_2$; where M is a metal; Y is bridging group such as NH or O; and R is a hydrophobic group such as $CH_3$, $CH_2CH_3$, $C_6H_6$, or similar hydrophobic alkyl, cycloalkyl, or aryl moieites. Specific examples of such hydrophobizing agents include, but are not limited to: hexamethyldisilazane [HMDZ] and hexamethyldisiloxane [HMDSO]. Hydrophobizing agents can further include compounds of the formula: $R_N MV_{4-N}$, wherein V is a reactive or leaving group other than a halogen. Specific examples of such hydrophobizing agents include, but are not limited to: vinyltriethoxysilane and vinyltrimethoxysilane.

Within the context of the present disclosure, the term "hydrophobic-bound silicon" refers to a silicon atom within the framework of a gel or aerogel which comprises at least one hydrophobic group covalently bonded to the silicon atom. Examples of hydrophobic-bound silicon include, but are not limited to, silicon atoms in silica groups within the gel framework which are formed from gel precursors comprising at least one hydrophobic group (such as MTES or DMDS). Hydrophobic-bound silicon can also include, but are not limited to, silicon atoms in the gel framework or on the surface of the gel which are treated with a hydrophobizing agent (such as HMDZ) to impart or improve hydrophobicity by incorporating additional hydrophobic groups into the composition. Hydrophobic groups of the present disclosure include, but are not limited to, methyl groups, ethyl groups, propyl groups, isopropyl groups, butyl groups, isobutyl groups, tertbutyl groups, octyl groups, phenyl groups, or other substituted or unsubstituted hydrophobic organic groups known to those with skill in the art. Within the context of the present disclosure, the terms "hydrophobic group," "hydrophobic organic material," and "hydrophobic organic content" specifically exclude readily hydrolysable organic silicon-bound alkoxy groups on the framework of the gel material which are the product of reactions between organic solvents and silanol groups.

Within the context of the present disclosure, the terms "aliphatic hydrophobic group," "aliphatic hydrophobic organic material," and "aliphatic hydrophobic organic content" describe hydrophobic groups on hydrophobic-bound silicon which are limited to aliphatic hydrocarbons, including, but not limited to hydrocarbon moieties containing 1-40 carbon atoms which can be saturated or unsaturated (but not aromatic), which can include straight-chain, branched, cyclic moieties (including fused, bridging, and spiro-fused polycyclic), or combinations thereof, such as alkyl, alkenyl, alkynyl, (cycloalkyl)alkyl, (cycloalkenyl)alkyl, or (cycloalkyl)alkenyl moieties, and hetero-aliphatic moieties (wherein one or more carbon atoms are independently replaced by one or more atoms selected from the group consisting of oxygen, sulfur, nitrogen, or phosphorus). In certain embodiments of the present disclosure, at least 50% of the hydrophobic organic material in the aerogel composition comprises aliphatic hydrophobic groups.

The amount of hydrophobic-bound silicon contained in an aerogel can be analyzed using NMR spectroscopy, such as CP/MAS $^{29}$Si Solid State NMR. An NMR analysis of an aerogel allows for the characterization and relative quantification of: M-type hydrophobic-bound silicon (monofunctional silica, such as TMS derivatives); D-type hydrophobic-bound silicon (bifunctional silica, such as DMDS derivatives); T-type hydrophobic-bound silicon (trifunctional silica, such as MTES derivatives); and Q-type silicon (quadfunctional silica, such as TEOS derivatives). NMR analysis can also be used to analyze the bonding chemistry of hydrophobic-bound silicon contained in an aerogel by allowing for categorization of specific types of hydrophobic-bound silicon into sub-types (such as the categorization of T-type hydrophobic-bound silicon into $T^1$ species, $T^2$ species, and $T^3$ species). Specific details related to the NMR analysis of silica materials can be found in the article "Applications of Solid-State NMR to the Study of Organic/Inorganic Multicomponent Materials" by Geppi et al., specifically pages 7-9 (Appl. Spec. Rev. (2008), 44-1: 1-89), which is hereby incorporated by reference according to the specifically cited pages.

The characterization of hydrophobic-bound silicon in a CP/MAS $^{29}$Si NMR analysis can be based on the following chemical shift peaks: $M^1$ (30 to 10 ppm); $D^1$ (10 to $-10$ ppm), $D^2$ ($-10$ to $-20$ ppm); $T^1$ ($-30$ to $-40$ ppm), $T^2$ ($-40$ to $-50$ ppm), $T^3$ ($-50$ to $-70$ ppm); $Q^2$ ($-70$ to $-85$ ppm), $Q^3$ ($-85$ to $-95$ ppm), $Q^4$ ($-95$ to $-110$ ppm). These chemical shift peaks are approximate and exemplary, and are not intended to be limiting or definitive. The precise chemical shift peaks attributable to the various silicon species within a material can depend on the specific chemical components of the material, and can generally be deciphered through routine experimentation and analysis by those in the art.

The aerogel materials of the present disclosure can have a ratio of $T^{1-2}:T^3$ of between about 0.01 and about 0.5, between about 0.01 and about 0.3, or between about 0.1 and about 0.3. A ratio of $T^{1-2}:T^3$ represents a ratio of a combination of $T^1$ and $T^2$ species relative to $T^3$ species. The amount of $T^1$, $T^2$ and $T^3$ can quantified by the integral of the individual chemical shift peaks respectively associated with $T^1$ species, $T^2$ species or $T^3$ species in a $^{29}$Si NMR analysis, as previously defined. The aerogel materials of the present disclosure can have a ratio of $Q^{2-3}:Q^4$ of between about 0.1 and 2.5, between about 0.1 and 2.0, between about 0.1 and 1.5, between about 0.1 and 1.0, or between about 0.5 and 1.0. A ratio of $Q^{2-3}:Q^4$ represents a ratio of a combination of $Q^2$ and $Q^3$ species relative to $Q^4$ species. The amount of $Q^2$, $Q^3$ and $Q^4$ can quantified by the integral of the individual chemical shift peak respectively associated with $Q^2$ species, $Q^3$ species or $Q^4$ species in a $^{29}$Si NMR analysis, as previously defined.

Within the context of the present disclosure, the term "hydrophobic organic content" refers to the amount of hydrophobic organic material bound to the framework in an aerogel material or composition. The hydrophobic organic content of an aerogel material or composition can be expressed as a weight percentage of the amount of hydrophobic organic material on the aerogel framework relative to the total amount of material in the aerogel material or composition. Hydrophobic organic content can be calculated by those with ordinary skill in the art based on the nature and relative concentrations of materials used in producing the aerogel material or composition. Hydrophobic organic content can also be measured using thermo-gravimetric analysis (TGA) in an inert atmosphere. Specifically, the percentage of hydrophobic organic material in an aerogel can be correlated with the percentage of weight loss in a hydrophobic aerogel material or composition when subjected to combustive heat temperatures during a TGA analysis, with adjustments being made for the loss of moisture, loss of residual solvent, and the loss of readily hydrolysable alkoxy groups during the TGA analysis.

Aerogel materials or compositions of the present disclosure can have a hydrophobic organic content of 50 wt % or less, 40 wt % or less, 30 wt % or less, 25 wt % or less, 20 wt % or less, 15 wt % or less, 10 wt % or less, 8 wt % or less, 6 wt % or less, 5 wt % or less, 4 wt % or less, 3 wt % or less, 2 wt % or less, 1 wt % or less, or in a range between any two of these values.

The term "fuel content" refers to the total amount of combustible material in an aerogel material or composition, which can be correlated with the total percentage of weight loss in an aerogel material or composition when subjected to combustive heat temperatures during a TGA or TG-DSC analysis, with adjustments being made for the loss of moisture. The fuel content of an aerogel material or composition can include hydrophobic organic content, as well as other combustible materials such as residual alcoholic solvents, filler materials, reinforcing materials, and readily hydrolysable alkoxy groups.

Organic aerogels are generally formed from carbon-based polymeric precursors. Such polymeric materials include, but are not limited to: resorcinol formaldehydes (RF), polyimide, polyacrylate, polymethyl methacrylate, acrylate oligomers, polyoxyalkylene, polyurethane, polyphenol, polybutadiane, trialkoxysilyl-terminated polydimethylsiloxane, polystyrene, polyacrylonitrile, polyfurfural, melamine-formaldehyde, cresol formaldehyde, phenol-furfural, polyether, polyol, polyisocyanate, polyhydroxybenze, polyvinyl alcohol dialdehyde, polycyanurates, polyacrylamides, various epoxies, agar, agarose, chitosan, and combinations thereof. As one example, organic RF aerogels are typically made from the sol-gel polymerization of resorcinol or melamine with formaldehyde under alkaline conditions.

Organic/inorganic hybrid aerogels are mainly comprised of ormosil (organically modified silica) aerogels. These ormosil materials include organic components which are covalently bonded to a silica network. Ormosils are typically formed through the hydrolysis and condensation of organically modified silanes, R—Si(OX)$_3$, with traditional alkoxide precursors, Y(OX)$_4$. In these formulas: X may represent, for example, CH$_3$, C$_2$H$_5$, C$_3$H$_7$, C$_4$H$_9$; Y may represent, for example, Si, Ti, Zr, or Al; and R may be any organic fragment such as methyl, ethyl, propyl, butyl, isopropyl, methacrylate, acrylate, vinyl, epoxide, and the like. The organic components in ormosil aerogel may also be dispersed throughout or chemically bonded to the silica network.

Within the context of the present disclosure, the term "ormosil" encompasses the foregoing materials as well as other organically modified ceramics, sometimes referred to as "ormocers." Ormosils are often used as coatings where an ormosil film is cast over a substrate material through, for example, the sol-gel process. Examples of other organic-inorganic hybrid aerogels of the disclosure include, but are not limited to, silica-polyether, silica-PMMA, silica-chitosan, carbides, nitrides, and other combinations of the aforementioned organic and inorganic aerogel forming compounds. Published US Pat. App. 20050192367 (Paragraphs [0022]-[0038] and [0044]-[0058]) includes teachings of such hybrid organic-inorganic materials, and is hereby incorporated by reference according to the individually cited sections and paragraphs.

Aerogels of the present disclosure are preferably inorganic silica aerogels formed primarily from alcohol solutions of hydrolyzed silicate esters formed from silicon alkoxides. However, the disclosure as a whole may be practiced with any other aerogel compositions known to those in the art, and is not limited to any one precursor material or amalgam mixture of precursor materials.

Production of an aerogel generally includes the following steps: i) formation of a sol-gel solution; ii) formation of a gel from the sol-gel solution; and iii) extracting the solvent from the gel materials through innovative processing and extraction, to obtain a dried aerogel material. This process is discussed below in greater detail, specifically in the context of forming inorganic aerogels such as silica aerogels. However, the specific examples and illustrations provided herein are not intended to limit the present disclosure to any specific type of aerogel and/or method of preparation. The present disclosure can include any aerogel formed by any associated method of preparation known to those in the art.

The first step in forming an inorganic aerogel is generally the formation of a sol-gel solution through hydrolysis and condensation of metal alkoxide precursors in an alcohol-based solvent. Major variables in the formation of inorganic aerogels include the type of alkoxide precursors included in the sol-gel solution, the nature of the solvent, the processing temperature and pH of the sol-gel solution (which may be altered by addition of an acid or a base), and precursor/solvent/water ratio within the sol-gel solution. Control of these variables in forming a sol-gel solution can permit control of the growth and aggregation of the gel framework during the subsequent transition of the gel material from the "sol" state to the "gel" state. While properties of the resulting aerogels are affected by the pH of the precursor solution and the molar ratio of the reactants, any pH and any molar ratios that permit the formation of gels may be used in the present disclosure.

A sol-gel solution is formed by combining at least one gelling precursor with a solvent. Suitable solvents for use in forming a sol-gel solution include lower alcohols with 1 to 6 carbon atoms, preferably 2 to 4, although other solvents can be used as known to those with skill in the art. Examples of useful solvents include, but are not limited to: methanol, ethanol, isopropanol, ethyl acetate, ethyl acetoacetate, acetone, dichloromethane, tetrahydrofuran, and the like. Multiple solvents can also be combined to achieve a desired level of dispersion or to optimize properties of the gel material. Selection of optimal solvents for the sol-gel and gel formation steps thus depends on the specific precursors, fillers and additives being incorporated into the sol-gel solution; as well as the target processing conditions for gelling and liquid phase extraction, and the desired properties of the final aerogel materials.

Water can also be present in the precursor-solvent solution. The water acts to hydrolyze the metal alkoxide precursors into metal hydroxide precursors. The hydrolysis reaction can be (using TEOS in ethanol solvent as an example): $Si(OC_2H_5)_4 + 4H_2O \rightarrow Si(OH)_4 + 4(C_2H_5OH)$. The resulting hydrolyzed metal hydroxide precursors remain suspended in the solvent solution in a "sol" state, either as individual molecules or as small polymerized (or oligomarized) colloidal clusters of molecules. For example, polymerization/condensation of the $Si(OH)_4$ precursors can occur as follows: $2\ Si(OH)_4 = (OH)_3Si\text{—}O\text{—}Si(OH)_3 + H_2O$. This polymerization can continue until colloidal clusters of polymerized (or oligomarized) $SiO_2$ (silica) molecules are formed.

Acids and bases can be incorporated into the sol-gel solution to control the pH of the solution, and to catalyze the hydrolysis and condensation reactions of the precursor materials. While any acid may be used to catalyze precursor reactions and to obtain a lower pH solution, preferable acids include: HCl, $H_2SO_4$, $H_3PO_4$, oxalic acid and acetic acid. Any base may likewise be used to catalyze precursor reactions and to obtain a higher pH solution, with a preferable base comprising $NH_4OH$.

The sol-gel solution can include additional co-gelling precursors, as well as filler materials and other additives. Filler materials and other additives may be dispensed in the sol-gel solution at any point before or during the formation of a gel. Filler materials and other additives may also be incorporated into the gel material after gelation through various techniques known to those in the art. Preferably, the sol-gel solution comprising the gelling precursors, solvents, catalysts, water, filler materials and other additives is a homogenous solution which is capable of effective gel formation under suitable conditions.

Once a sol-gel solution has been formed and optimized, the gel-forming components in the sol-gel can be transitioned into a gel material. The process of transitioning gel-forming components into a gel material comprises an initial gel formation step wherein the gel solidifies up to the gel point of the gel material. The gel point of a gel material may be viewed as the point where the gelling solution exhibits resistance to flow and/or forms a substantially continuous polymeric framework throughout its volume. A range of gel-forming techniques are known to those in the art. Examples include, but are not limited to: maintaining the mixture in a quiescent state for a sufficient period of time; adjusting the pH of the solution; adjusting the temperature of the solution; directing a form of energy onto the mixture (ultraviolet, visible, infrared, microwave, ultrasound, particle radiation, electromagnetic); or a combination thereof.

The process of transitioning gel-forming components into a gel material can also include an aging step (also referred to as curing) prior to liquid phase extraction. Aging a gel material after it reaches its gel point can further strengthen the gel framework by increasing the number of cross-linkages within the network. The duration of gel aging can be adjusted to control various properties within the resulting aerogel material. This aging procedure can be useful in preventing potential volume loss and shrinkage during liquid phase extraction. Aging can involve: maintaining the gel (prior to extraction) at a quiescent state for an extended period; maintaining the gel at elevated temperatures; adding cross-linkage promoting compounds; or any combination thereof. The preferred temperatures for aging are usually between about 10° C. and about 100° C. The aging of a gel material typically continues up to the liquid phase extraction of the wet-gel material.

The time period for transitioning gel-forming materials into a gel material includes both the duration of the initial gel formation (from initiation of gelation up to the gel point), as well as the duration of any subsequent curing and aging of the gel material prior to liquid phase extraction (from the gel point up to the initiation of liquid phase extraction). The total time period for transitioning gel-forming materials into a gel material is typically between about 1 minute and several days, preferably about 30 hours or less, about 24 hours or less, about 15 hours or less, about 10 hours or less, about 6 hours or less, about 4 hours or less, about 2 hours or less, about 1 hour or less, about 30 minutes or less, or about 15 minutes or less.

The resulting gel material may be washed in a suitable secondary solvent to replace the primary reaction solvent present in the wet-gel. Such secondary solvents may be linear monohydric alcohols with 1 or more aliphatic carbon atoms, dihydric alcohols with 2 or more carbon atoms, branched alcohols, cyclic alcohols, alicyclic alcohols, aromatic alcohols, polyhydric alcohols, ethers, ketones, cyclic ethers or their derivative.

Once a gel material has been formed and processed, the liquid phase of the gel can then be at least partially extracted from the wet-gel using extraction methods, including innovative processing and extraction techniques, to form an aerogel material. Liquid phase extraction, among other factors, plays an important role in engineering the characteristics of aerogels, such as porosity and density, as well as related properties such as thermal conductivity. Generally, aerogels are obtained when a liquid phase is extracted from a gel in a manner that causes low shrinkage to the porous network and framework of the wet gel.

Aerogels are commonly formed by removing the liquid mobile phase from the gel material at a temperature and pressure near or above the critical point of the liquid mobile phase. Once the critical point is reached (near critical) or surpassed (supercritical) (i.e pressure and temperature of the system is at or higher than the critical pressure and critical temperature respectively) a new supercritical phase appears in the fluid that is distinct from the liquid or vapor phase. The solvent can then be removed without introducing a liquid-vapor interface, capillary pressure, or any associated mass transfer limitations typically associated with liquid-vapor boundaries. Additionally, the supercritical phase is more miscible with organic solvents in general, thus having the capacity for better extraction. Co-solvents and solvent exchanges are also commonly used to optimize the supercritical fluid drying process.

If evaporation or extraction occurs below the supercritical point, capillary forces generated by liquid evaporation can cause shrinkage and pore collapse within the gel material. Maintaining the mobile phase near or above the critical pressure and temperature during the solvent extraction process reduces the negative effects of such capillary forces. In certain embodiments of the present disclosure, the use of near-critical conditions just below the critical point of the solvent system may allow production of aerogel materials or compositions with sufficiently low shrinkage, thus producing a commercially viable end-product.

Several additional aerogel extraction techniques are known in the art, including a range of different approaches in the use of supercritical fluids in drying aerogels. For example, Kistler (J. Phys. Chem. (1932) 36: 52-64) describes a simple supercritical extraction process where the gel solvent is maintained above its critical pressure and temperature, thereby reducing evaporative capillary forces and maintaining the structural integrity of the gel network. U.S. Pat. No. 4,610,863 describes an extraction process where the gel solvent is exchanged with liquid carbon dioxide and subsequently extracted at conditions where carbon dioxide is in a supercritical state. U.S. Pat. No. 6,670,402 teaches extracting a liquid phase from a gel via rapid solvent exchange by injecting supercritical (rather than liquid) carbon dioxide into an extractor that has been pre-heated and pre-pressurized to substantially supercritical conditions or above, thereby producing aerogels. U.S. Pat. No. 5,962,539 describes a process for obtaining an aerogel from a polymeric material that is in the form a sol-gel in an organic solvent, by exchanging the organic solvent for a fluid having a critical temperature below a temperature of polymer decomposition, and supercritically extracting the fluid/sol-gel. U.S. Pat. No. 6,315,971 discloses a process for producing gel compositions comprising: drying a wet gel comprising gel solids and a drying agent to remove the drying agent under drying conditions sufficient to reduce shrinkage of the gel during drying. U.S. Pat. No. 5,420,168 describes a process whereby Resorcinol/Formaldehyde aerogels can be manufactured using a simple air drying procedure. U.S. Pat. No. 5,565,142 describes drying techniques in which the gel surface is modified to be stronger and more hydrophobic, such that the gel framework and pores can resist collapse during ambient drying or subcritical extraction. Other examples of extracting a liquid phase from aerogel materials can be found in U.S. Pat. Nos. 5,275,796 and 5,395,805.

One preferred embodiment of extracting a liquid phase from the wet-gel uses supercritical conditions of carbon dioxide, including, for example: first substantially exchanging the primary solvent present in the pore network of the gel with liquid carbon dioxide; and then heating the wet gel (typically in an autoclave) beyond the critical temperature of carbon dioxide (about 31.06° C.) and increasing the pressure of the system to a pressure greater than the critical pressure of carbon dioxide (about 1070 psig). The pressure around the gel material can be slightly fluctuated to facilitate removal of the supercritical carbon dioxide fluid from the gel. Carbon dioxide can be recirculated through the extraction system to facilitate the continual removal of the primary solvent from the wet gel. Finally, the temperature and pressure are slowly returned to ambient conditions to produce a dry aerogel material. Carbon dioxide can also be pre-processed into a supercritical state prior to being injected into an extraction chamber.

One example of an alternative method of forming an aerogel includes the acidification of basic metal oxide precursors (such as sodium silicate) in water to make a hydrogel. Salt by-products may be removed from the silicic acid precursor by ion-exchange and/or by washing subsequently formed gels with water. Removing the water from the pores of the gel can be performed via exchange with a polar organic solvent such as ethanol, methanol, or acetone. The liquid phase in the gel is then at least partially extracted using innovative processing and extraction techniques.

Another example of an alternative method of forming aerogels includes reducing the damaging capillary pressure forces at the solvent/pore interface by chemical modification of the matrix materials in their wet gel state via conversion of surface hydroxyl groups to hydrophobic trimethylsilylethers, thereby allowing for liquid phase extraction from the gel materials at temperatures and pressures below the critical point of the solvent.

Large-scale production of aerogel materials or compositions can be complicated by difficulties related to the continuous formation of gel materials on a large scale; as well as the difficulties related to liquid phase extraction from gel materials in large volumes using innovative processing and extraction techniques. Aerogel materials or compositions of the present disclosure are preferably accommodating to production on a large scale. In certain embodiments, gel materials of the present disclosure can be produced in large scale through a continuous casting and gelation process. In certain embodiments, aerogel materials or compositions of the present disclosure are produced in a large scale which requires the use of large scale extraction vessels. Large scale extraction vessels of the present disclosure can include extraction vessels which have a volume of about 0.1 m³ or more, about 0.25 m³ or more, about 0.5 m³ or more, or about 0.75 m³ or more.

Aerogel compositions of the present disclosure can have a thickness of 15 mm or less, 10 mm or less, 5 mm or less, 3 mm or less, 2 mm or less, or 1 mm or less.

The dry aerogel material or composition can be further processed to optimize target properties of the aerogel material or composition. In certain embodiments, dried aerogel compositions can be subjected to one or more heat treatments, such as pyrolysis, to produce a heat treated aerogel composition. Carefully controlled heat treatment can be used to reduce or stabilize the hydrocarbon fuel content of an aerogel material or composition, which can improve corresponding HOC and $T_d$ properties of the aerogel material or composition. In certain embodiments, the heat treatment of a dried aerogel composition can take place under a range of temperatures, pressures, durations, and atmospheric conditions.

In certain embodiments of the present disclosure, a dried aerogel composition can be subjected to a treatment temperature of 200° C. or above, 250° C. or above, 300° C. or above, 350° C. or above, 400° C. or above, 450° C. or above, 500° C. or above, 550° C. or above, 600° C. or above, 650° C. or above, 700° C. or above, 750° C. or above, 800° C. or above, or in a range between any two of these values.

In certain embodiments of the present disclosure, a dried aerogel composition can be subjected to one or more heat treatments for a duration of time of 3 hours or more, between 10 seconds and 3 hours, between 10 seconds and 2 hours, between 10 seconds and 1 hour, between 10 seconds and 45 minutes, between 10 seconds and 30 minutes, between 10 seconds and 15 minutes, between 10 seconds and 5 minutes, between 10 seconds and 1 minute, between 1 minute and 3 hours, between 1 minute and 1 hour, between 1 minute and 45 minutes, between 1 minute and 30 minutes, between 1 minute and 15 minutes, between 1 minute and 5 minutes, between 10 minutes and 3 hours, between 10 minutes and 1 hour, between 10 minutes and 45 minutes, between 10 minutes and 30 minutes, between 10 minutes and 15 minutes, between 30 minutes and 3 hours, between 30 minutes and 1 hour, between 30 minutes and 45 minutes, between 45 minutes and 3 hours, between 45 minutes and 90 minutes, between 45 minutes and 60 minutes, between 1 hour and 3 hours, between 1 hour and 2 hours, between 1 hour and 90 minutes, or in a range between any two of these values.

In certain embodiments of the present disclosure, a dried aerogel composition can be subjected to a treatment temperature between 200° C. and 750° C. for a duration of time between 10 seconds and 3 hours.

The heat treatment of the aerogel material or composition can take place in a reduced oxygen environment. Within the context of the present disclosure, the term "reduced oxygen environment" refers to an atmosphere which comprises a concentration by volume of 10 vol % oxygen or less (which is below the amount of oxygen in ambient air at standard conditions). A reduced oxygen environment can comprise positive pressurized atmospheres which have elevated concentrations of inert gases, including (but not limited to) nitrogen, argon, helium, neon, argon, and xenon. A reduced oxygen environment can also comprise vacuum atmospheres which have reduced concentrations of oxygen, including vacuums and partial vacuums. A reduced oxygen environment can further include atmospheres contained in a sealed container in which limited combustion has consumed a portion of the oxygen content in the sealed atmosphere. A reduced oxygen environment can comprise 10 vol % oxygen or less, 8 vol % oxygen or less, 6 vol % oxygen or less, 5 vol % oxygen or less, 4 vol % oxygen or less, 3 vol % oxygen or less, 2 vol % oxygen or less, or 1 vol % oxygen or less. A reduced oxygen environment can comprise between 0.1 to 10 vol % oxygen, between 0.1 to 5 vol % oxygen, between 0.1 to 3 vol % oxygen, between 0.1 to 2 vol % oxygen, or between 0.1 to 1 vol % oxygen. In certain embodiments of the present disclosure, a hydrophobic aerogel material or composition is heat treated in a reduced oxygen atmosphere comprising between about 85% to about 99.9% inert gas (such as nitrogen). In a preferred embodiment of the present disclosure, a dried hydrophobic aerogel composition is heat treated in a reduced oxygen atmosphere comprising between about 95% to about 99.9% inert gas (such as nitrogen) at a temperature between about 200° C. and about 800° C. for a duration of time between about 1 minute and about 3 hours.

Heat treatment of an aerogel material or composition can be highly detrimental to various properties of certain aerogel materials. For example: Rao et al (J. Sol-Gel Sci. Tech., 2004, 30:141-147) teaches an aerogel material made from TEOS precursors with a variety of hydrophobic reagents (including MTMS, MTES, TMES, PhTES, ETES, DMCS, TMCS and HMDZ) added through both co-gelling and surface derivatization to provide hydrophobicity, but which all lose hydrophobicity when exposed to temperatures above 310° C. (except the DMCS co-gel, which is stable up to 390° C., and the PhTES co-gel, which is stable up to 520° C.); Liu et al. (J. Sol-Gel Sci. Tech., 2012, 62:126-133) teaches an aerogel material made from sodium silicate precursors which is treated with HMDZ to provide hydrophobicity, but which loses its hydrophobicity when exposed to temperatures above 430° C. in standard atmosphere; Zhou et al. (Inorg. Mat., 2008, 44-9:976-979) teaches an aerogel material made from TEOS precursors which is treated with TMCS to provide hydrophobicity, but which loses its hydrophobicity when exposed to temperatures above 500° C. in standard atmosphere. In certain embodiments of the present disclosure, the heat treatment of the aerogel material or composition of the present disclosure is limited to temperature exposures below 950° C., below 900° C., below 850° C., below 800° C., below 750° C., below 700° C., below 650° C., or below 600° C.

In certain embodiments, the present disclosure provides aerogel materials, compositions and processing methods which allow for controlled heat treatment to reduce or stabilize the hydrocarbon fuel content of the aerogel material (thereby improving corresponding properties of the aerogel material such as HOC and $T_d$); and which also allow for the aerogel material to maintain functional levels of hydrophobicity at high temperatures, including exposures to temperatures of about 550° C. or more, and exposures to temperatures of about 650° C. or more.

The embodiments of the present disclosure can be practiced using any of the processing, extraction and treatment techniques discussed herein, as well as other processing, extraction and treatment techniques known to those in the art for producing aerogels, aerogel-like materials, and aerogel compositions as defined herein.

Aerogel compositions may be fiber-reinforced with various fiber reinforcement materials to achieve a more flexible, resilient and conformable composite product. The fiber reinforcement materials can be added to the gels at any point in the gelling process to produce a wet, fibrous gel composition. The wet gel composition may then be dried to produce a fiber-reinforced aerogel composition. Fiber reinforcement materials may be in the form of discrete fibers, woven materials, non-woven materials, battings, webs, mats, and felts. Fiber reinforcements can be made from organic fibrous materials, inorganic fibrous materials, or combinations thereof.

In a preferred embodiment, non-woven fiber reinforcement materials are incorporated into the aerogel composition as continuous sheet of interconnected or interlaced fiber reinforcement materials. The process comprises initially producing a continuous sheet of fiber reinforced gel by casting or impregnating a gel precursor solution into a continuous sheet of interconnected or interlaced fiber reinforcement materials. The liquid phase may then be at least partially extracted from the fiber-reinforced gel sheets to produce a sheet-like, fiber reinforced aerogel composition.

Aerogel composition can also include an opacifier to reduce the radiative component of heat transfer. At any point prior to gel formation, opacifying compounds or precursors thereof may be dispersed into the mixture comprising gel precursors. Examples of opacifying compounds include, but are not limited to: Boron Carbide [$B_4C$], Diatomite, Manganese ferrite, MnO, NiO, SnO, $Ag_2O$, $Bi_2O_3$, carbon black, titanium oxide, iron titanium oxide, aluminum oxide, zirconium silicate, zirconium oxide, iron (II) oxide, iron (III) oxide, manganese dioxide, iron titanium oxide (ilmenite), chromium oxide, carbides (such as SiC, TiC or WC), or mixtures thereof. Examples of opacifying compound precursors include, but are not limited to: $TiOSO_4$ or $TiOCl_2$.

The aerogel materials and compositions of the present disclosure have been shown to be highly effective as insulation materials. However, application of the methods and materials of the present disclosure are not intended to be limited to applications related to insulation. The methods and materials of the present disclosure can be applied to any system or application which would benefit from the unique combination of properties or procedures provided by the materials and methods of the present disclosure.

The following examples provide various non-limiting embodiments and properties of the present disclosure.

Example 1

K grade sodium silicate was used as a precursor, which comprised a $SiO_2$:$Na_2O$ ratio of 2.88 by wt, and contained 31.7 wt % $SiO_2$ and 11 wt % $Na_2O$. Sodium methylsiliconate was available as 30% $NaSiO_3CH_3$ in water. Sodium silicate and sodium methylsiliconate were combined so that 31.4% of the resulting aerogel mass originated from sodium methylsiliconate ($SiO_{1.5}CH_3$ from $NaSiO_3CH_3$), with an expected hydrophobic organic content of 7.0 wt % within the aerogel material.

This combination was diluted with water before adding it to 32% $H_2SO_4$ so that there was 9.68 wt % silica solids (6.64 wt % $SiO_2$ and 3.04 wt % $SiO_{1.5}CH_3$) in the acidified sol. Both the $H_2SO_4$ and the $Na_2SiO_3$ were chilled to 10° C. in an ice bath. $Na_2SiO_3$ was added slowly to the $H_2SO_4$ with rapid stirring. This exothermic addition was done at a rate such that the temperature was never above 12° C. to avoid gelation. The sol was cooled to 4° C. to encourage precipitation of some $Na_2SO_4 \cdot 10H_2O$. The temperature of the solution was maintained at 4° C. To further precipitate sodium sulfate, ethanol was added in an amount equivalent to 68.7% of the volume of the aqueous sol, so that the molar ratio of components in the sol was 1:0.409:2.34:6.97:0.156 of Si (from waterglass):Si (from methyl siliconate):EtOH:$H_2O$:$H_2SO_4$. The $Na_2SO_4$ was immediately removed by vacuum filtration.

Gels were cast at target aerogel density of 0.07-0.08 g/cc by addition of dilute ammonium hydroxide (10 vol % of 28% $NH_4OH$ in water) as catalyst. 85 vol % sol, 5 vol % EtOH, and 10 vol % catalyst stream were used (added over a few seconds). After the catalyst addition, the sol was stirred at 300 rpm for 30 s, then cast into a fiber reinforcing phase and allowed to gel. After curing for about 1 h, the aerogel materials were put in an EtOH bath with an EtOH:gel volume ratio of 3:1 for 6 h to reduce the water content prior to aging. They were then aged for 14 h at 68° C. in ethanol aging fluid containing 0.8 wt/vol % $NH_3$ at a fluid:gel ratio of 3:1. The coupons were subjected to solvent extraction with supercritical $CO_2$, and then dried for 2 h at 110° C.

The fiber reinforcing phase was a silica PD batting with 9-micron diameter fibers, about 10 mm thick with a density of about 3.8 oz/sq ft. The resulting aerogel material was about 45 wt % aerogel and 55 wt % fiber, resulting in an expected material density of about 0.16-0.20 g/cc (given a 0.07-0.08 g/cc aerogel density).

Example 2

Sols were made by co-hydrolyzing TEOS and MTES in EtOH and $H_2O$ with acid catalyst. The molar ratio of sol materials were adjusted to obtain aerogels with about 7.0 wt % organic content within the aerogel material. The sol was stirred for 4 h at 60° C., then cooled to room temperature. There was about a 3% loss of sol volume during hydrolysis, and EtOH was added to return the sol to its original volume.

0.5M $NH_4OH$ was added to the combined sol, with a target aerogel density of 0.07-0.08 g/cc The sol was cast into a fiber reinforcing phase and allowed to gel. After curing for about 1 h, the aerogel materials were aged for about 16 h at 68° C. in ethanol aging fluid containing 0.8 wt/vol % $NH_3$ at a fluid:gel ratio of 3:1. The coupons were subjected to solvent extraction with supercritical $CO_2$, and then dried for 2 h at 110° C.

The fiber reinforcing phase was a silica PD batting with 9-micron diameter fibers, about 10 mm thick with a density of about 3.8 oz/sq ft. The resulting aerogel material was about 45 wt % aerogel and 55 wt % fiber, resulting in an expected material density of about 0.16-0.20 g/cc (given a 0.07-0.08 g/cc aerogel density).

Example 3

Sols are made by co-hydrolyzing TEOS and MTES in EtOH and $H_2O$ with acid catalyst. The molar ratio of sol materials are adjusted to obtain aerogels with about 7.0 wt % organic content within the aerogel material. The sol is stirred for 4 h at 60° C., then cooled to room temperature. Boron carbide [$B_4C$], carbon black, manganese dioxide, titanium oxide, or zirconium silicate are incorporated into separate batches of the combined sol, which is then stirred for no less than 1 h.

0.5M $NH_4OH$ is added to the combined sol, with a target aerogel density of 0.07-0.08 g/cc The sol is cast into a fiber reinforcing phase and allowed to gel. After curing for about 1 h, the aerogel materials are aged for about 16 h at 68° C. in ethanol aging fluid containing 0.8 wt/vol % $NH_3$ at a fluid:gel ratio of 3:1. The coupons are subjected to solvent extraction with supercritical $CO_2$, and then dried for 2 h at 110° C.

The fiber reinforcing phase is a silica PD batting with 9-micron diameter fibers, about 10 mm thick with a density of about 3.8 oz/sq ft. The resulting aerogel material is about 45 wt % aerogel and 55 wt % fiber, resulting in an expected material density of about 0.16-0.20 g/cc (given a 0.07-0.08 g/cc aerogel density).

Example 4

Polyethylsilicate sol was produced by hydrolyzing TEOS in EtOH and $H_2O$ with acid catalyst, and then stirred at ambient temperature for no less than 6 h. Polymethylsilsesquioxane sol was produced by hydrolyzing MTES in EtOH and $H_2O$ with acid catalyst, and then stirred at ambient temperature for no less than 6 h. Polyethylsilicate (TEOS) and polymethylsilsesquioxane (MTES) sols were combined in order to obtain aerogels with about 10-11 wt % organic content. Silicon carbide powder (F1200 Grit) or titanium dioxide powder were incorporated into separate batches of the combined sol, with a weight ratio of sol-to-powder of about 15:1. The combined sol was stirred for no less than 1 h.

0.5M $NH_4OH$ was added to the combined sol, with a target density of the final aerogels of 0.07-0.08 g/cc. The sol was cast into a non-woven, glass-fiber reinforcing phase and allowed to gel. The aerogel materials were aged for no less than 10 h in ethanol aging fluid containing 0.5 wt/vol % $NH_3$. The coupons were subjected to solvent extraction with supercritical $CO_2$, and then dried in conventional heat at about 180° C.

The resulting aerogel material was about 45 wt % aerogel and 55 wt % fiber, resulting in an expected material density of about 0.16-0.20 g/cc (given a 0.07-0.08 g/cc aerogel density).

Example 5

Polyethylsilicate sol is produced by hydrolyzing TEOS in EtOH and $H_2O$ with acid catalyst, and is then stirred at ambient temperature for no less than 6 h. Polymethylsilsesquioxane sol is produced by hydrolyzing MTES in EtOH and $H_2O$ with acid catalyst, and is then stirred at ambient temperature for no less than 6 h. Polyethylsilicate (TEOS) and polymethylsilsesquioxane (MTES) sols are combined in order to obtain aerogels with about 10-11 wt % organic content. Iron oxide, titanium carbide, diatomite, manganese ferrite or iron titanium oxide are incorporated into separate batches of the combined sol. The combined sol is stirred for no less than 1 h.

0.5M $NH_4OH$ is added to the combined sol, with a target density of the final aerogels of 0.07-0.08 g/cc. The sol is cast into a non-woven, glass-fiber reinforcing phase and allowed to gel. The aerogel materials are aged for no less than 10 h in ethanol aging fluid containing 0.5 wt/vol % $NH_3$. The coupons are subjected to solvent extraction with supercritical $CO_2$, and then dried in conventional heat at about 180° C.

The resulting aerogel material are about 45 wt % aerogel and 55 wt % fiber, resulting in an expected material density of about 0.16-0.20 g/cc (given a 0.07-0.08 g/cc aerogel density).

Example 6

Sols were made by co-hydrolyzing TEOS and an organosilane hydrophobe, in EtOH and 1 mM aq oxalic acid. The organosilane hydrophobe coprecursors could be chosen from the following: methyl trimethoxysilane (MTMS), methyl triethoxysilane (MTES), trimethyl ethoxysilane (TMES), ethyl triethoxysilane (ETES), and phenyl triethoxysilane (PhTES). In this example, PhTES was used as the organosilane hydrophobe. The molar ratio of EtOH:$H_2O$:oxalic acid was kept constant at $5:7:1.26\times10^{-4}$, with the oxalic acid introduced together with the water as 1 mM oxalic acid. A molar ratio of TEOS and PhTES was provided in order to obtain aerogels with 8.0 and 9.0 wt % hydrophobic organic content in each case, and the target density was 0.07-0.08 g/cc. The molar ratios of sol components for these two formulations were $0.0719 18.98:12.57:2.26\times10^{-4}$ and $0.0825:1:9.18:12.85:2.31\times10^{-4}$ PhTES:TEOS:EtOH:$H_2O$:oxalic acid, respectively.

The sols were stirred for 15 min, then cast into a fiber reinforcing phase, and allowed to gel in an oven at 60° C. After curing for 21-33 h at 60° C., the aerogel materials were aged for 22 h at 68° C. in ethanol aging fluid containing 0.8 wt/vol % $NH_3$ at a fluid:gel ratio of 3:1. The coupons were subjected to solvent extraction with supercritical $CO_2$, and then dried for 2 h at 110° C.

The fiber reinforcing phase was a silica PD batting with 9-micron diameter fibers, about 10 mm thick with a density of about 3.8 oz/sq ft. The resulting aerogel material was about 45 wt % aerogel and 55 wt % fiber, resulting in an expected material density of about 0.16-0.20 g/cc (given a 0.07-0.08 g/cc aerogel density).

Example 7

Sols were made by co-hydrolyzing TEOS and PhTES in MeOH with 1 mM aq oxalic acid catalyst. The molar ratio of MeOH:$H_2O$:oxalic acid was kept constant at $66:7:1.26\times10^{-4}$, with the oxalic acid introduced together with the water as 1 mM oxalic acid. The target density was 0.07-0.08 g/cc for all formulations. The PhTES content was varied to achieve aerogels with 7.0, 11.0, or 19.0 wt % target organic content. The molar ratios of sol components for these formulations were $1:0.062:16.57:1.76:3.16\times10^{-5}$, $1:0.105:18.15:1.93:3.47\times10^{-5}$, and $1:0.217:22.18:2.35:4.24\times10^{-5}$ TEOS:PhTES:MeOH:$H_2O$:oxalic acid, respectively. The sols were stirred for 24 h at 28° C.

To gel the hydrolyzed sols, 1 M $NH_4OH$ was added in an amount that adds an additional 1 mol of $H_2O$ for every mol of $H_2O$ in the previous step. This contributes 0.0316, 0.0347, or 0.0424 mol $NH_4OH$ per mol of TEOS for the 7.0, 11.0, and 19.0 wt % organics formulations, respectively. The sols were stirred for 3 min, then cast into a fiber reinforcing phase, and allowed to gel at 28° C. The gels were cured at room temperature for 2 days, then soaked in an ethanol bath for 4 days with fresh ethanol every 24 h. The coupons were subjected to solvent extraction with supercritical $CO_2$, and then dried for 2 h at 110° C.

The fiber reinforcing phase was a silica PD batting with 9-micron diameter fibers, about 10 mm thick with a density of about 3.8 oz/sq ft. The resulting aerogel material was about 45 wt % aerogel and 55 wt % fiber, resulting in an expected material density of about 0.16-0.20 g/cc (given a 0.07-0.08 g/cc aerogel density).

Example 8

Sols were made by co-hydrolyzing tetramethylorthosilicate (TMOS) and PhTES in MeOH with 86 mM $NH_4OH$ catalyst. The molar ratio between the solvents and catalyst was kept constant at $11:5:3.7\times10^{-3}$ MeOH:$H_2O$:$NH_4OH$, with the $NH_4OH$ introduced together with the water as 86 mM $NH_4OH$. The target density was 0.07-0.08 g/cc for all formulations. The PhTES content was varied to achieve aerogels with 7.0, 11.0, or 19.0 wt % target organic content. The molar ratios of sol components for these formulations were 1:0.062:16.61:7.55:5.59×10$^{-3}$, 1:0.105:18.04:8.20:6.07×10$^{-3}$, and 1:0.217:21.78:9.90:7.33×10$^{-3}$ TMOS:PhTES:MeOH:$H_2O$:$NH_4OH$, respectively.

The sols were stirred for 15 min, then cast into a fiber reinforcing phase, and allowed to gel. The gels were cured at room temperature for 3 days, then soaked in an ethanol bath for 4 days with fresh ethanol every 24 h. The coupons were subjected to solvent extraction with supercritical $CO_2$, and then dried for 2 h at 110° C.

The fiber reinforcing phase was a silica PD batting with 9-micron diameter fibers, about 10 mm thick with a density of about 3.8 oz/sq ft. The resulting aerogel material was about 45 wt % aerogel and 55 wt % fiber, resulting in an expected material density of about 0.16-0.20 g/cc (given a 0.07-0.08 g/cc aerogel density).

Example 9

Sols were made by co-hydrolyzing TEOS and 1,2-bis (triethoxysilyl)ethane (BTESE) in EtOH and $H_2O$ with 1M HCl catalyst. Aerogels with 7.0, 8.0, or 9.0 wt % organic content were obtained by using TEOS:BTESE:EtOH:$H_2O$:HCl molar ratios of 1:0.223:13.84:3.46:2.42×10$^{-3}$, 1:0.275:15.04:3.76:2.63×10$^{-3}$, and 1:0.334:16.24:4.06:2.84×10$^{-3}$, respectively. In each case, the ratio between the solvents and catalyst was kept constant at 8:2:1.4×10$^{-3}$ EtOH:$H_2O$:HCl while the BTESE content was varied. The sol was stirred for 4 h at 60° C., then cooled to room temperature. There was about a 3% loss of sol volume during hydrolysis, and EtOH was added to return the sol to its original volume.

To gel the hydrolyzed sol, diluted $NH_4OH$ was added so that the final casted sol contained 8.0 vol % 0.5 M $NH_4OH$, and the target density of the final aerogels was 0.07-0.08 g/cc. The sol was was cast into a fiber reinforcing phase and allowed to gel. After curing for about 1 h, the aerogel materials were aged for about 16 h at 68° C. in ethanol aging fluid containing 0.8 wt/vol % $NH_3$ at a fluid:gel ratio of 3:1. The coupons were subjected to solvent extraction with supercritical $CO_2$, and then dried for 2 h at 110° C.

The fiber reinforcing phase was a silica PD batting with 9-micron diameter fibers, about 10 mm thick with a density of about 3.8 oz/sq ft. The resulting aerogel material was about 45 wt % aerogel and 55 wt % fiber, resulting in an expected material density of about 0.16-0.20 g/cc (given a 0.07-0.08 g/cc aerogel density).

Example 10

K grade sodium silicate is used as a precursor, which comprises a $SiO_2$:$Na_2O$ ratio of 2.88 by wt, and contains 31.7 wt % $SiO_2$ and 11 wt % $Na_2O$. The sodium silicate precursor is first diluted with water, then added to 32% $H_2SO_4$. The resulting solution comprises 10.34 wt % $SiO_2$, 1.34 M $Na^+$, and 1.50 M $H^+$ in the acidified sol. Both the $H_2SO_4$ and the $Na_2SiO_3$ are chilled to 10° C. in an ice bath, then the $Na_2SiO_3$ is added slowly to the $H_2SO_4$ solution with rapid stirring. This exothermic addition is done at a rate such that the temperature is never above 12° C. to avoid gelation. The sol is cooled to 4° C. to encourage precipitation of some $Na_2SO_4.10H_2O$. The temperature of the solution is maintained at 4° C.

THF is added in an amount until 6.72 wt % $SiO_2$ is in the final sol, thereby further precipitating $Na_2SO_4$. The precipitated $Na_2SO_4$ is immediately removed by vacuum filtration, and NaCl is added to the filtered sol solution until the sol is saturated. The NaCl induces separation of an aqueous and an organic phase. 95% of the $H_2O$ is removed from the organic phase, and 100% of the $SiO_2$ is partitioned into the organic phase. The organic phase is isolated, with an expected solid content of about 0.18 g $SiO_2$/mL. Ethanol is added in an amount equivalent to 104% of the volume of the THF layer, such that the molar ratio of components in the sol is 1(Si):6.256(EtOH):0.975($H_2O$):4.115(THF).

An MTES precursor sol solution is prepared, comprising: 69.4 wt % MTES with 2.7 $H_2O$:Si (mole ratio) and 70 mM acetic acid (99.7%) diluted with EtOH, which provides an expected 26 wt % solid content [$SiO_{1.5}(CH_3)$]. The molar ratio of MTES:EtOH:$H_2O$:HOAc is 1:0.624:2.703:0.0199. The sol is stirred for 5 h in a thermos, then quenched by chilling.

85.9 vol % silicic acid sol (1a) and 14.1 vol % MTES sol (1b) are combined and stirred for 2 h, with an expected 31.4 wt % of the final aerogel mass originating from the hydrophobic component ($SiO_{1.5}CH_3$ from MTES), and an expected hydrophobic organic content of 7.0 wt %.

Gels are cast at a target aerogel density of 0.07-0.08 g/cc by addition of EtOH and dilute ammonium hydroxide (2.5 vol % of 28% $NH_4OH$ in water) as catalyst. 67 vol % sol solution, 21 vol % EtOH, and 12 vol % catalyst stream are used (added over a few seconds). After catalyst addition, the sol is stirred at 300 rpm for 30 s, then cast into a fiber reinforcing phase and allowed to gel. After curing for about 1 h, the aerogel materials are aged for about 16 h at 68° C. in ethanol aging fluid containing 0.8 wt/vol % $NH_3$ at a fluid:gel ratio of 3:1. The coupons are subjected to solvent extraction with supercritical $CO_2$, and then dried for 2 h at 110° C.

The fiber reinforcing phase is a silica PD batting with 9-micron diameter fibers, about 10 mm thick with a density of about 3.8 oz/sq ft. The resulting aerogel material is about 45 wt % aerogel and 55 wt % fiber, resulting in an expected material density of about 0.16-0.20 g/cc (given a 0.07-0.08 g/cc aerogel density).

Example 11

K grade sodium silicate is used, which has 2.88 $SiO_2$: $Na_2O$ by wt, contains 31.7 wt % $SiO_2$ and 11 wt % $Na_2O$, and has a density of 1.48 g/mL. It is first diluted with water so that the diluted solution contains 22.1 wt % original waterglass (7.0 wt % $SiO_2$). The dilute sodium silicate is ion exchanged by passing it through amberlite $Na^+$ resin. The resulting silicic acid is then gelled by addition of $H_2O$ and 1 M $NH_4OH$ catalyst so that the diluent $H_2O$ and the catalyst stream constitute 6.9 vol % and 0.4 vol %, respectively, of the final hydrosol. The sol is stirred at 300 rpm for 30 seconds prior to casting into a fiber reinforcing phase and gelation. The molar ratio of Si:$H_2O$:$NH_3$ is 1:47.8:0.0016 and the targeted silica aerogel density is 0.07-0.08 g/cc. The gels are aged at 50° C. for 3 h. Solvent exchange with ethanol is carried out three times in 36 h, then the ethanol is exchanged with hexane three times in 36 h.

The fiber reinforcing phase is a silica PD batting with 9-micron diameter fibers, about 10 mm thick with a density of about 3.8 oz/sq ft. The resulting aerogel material is about 45 wt % aerogel and 55 wt % fiber, resulting in an expected material density of about 0.16-0.20 g/cc (given a 0.07-0.08 g/cc aerogel density, not including the hydrophobic treatment).

Hydrophobic treatment of the wet gel is done with one of the following hydrophobic silylating agents: methyltrimethoxysilane (MTMS), methyltriethoxysilane (MTES), vinyltrimethoxysilane (VTMS), phenyltrimethoxysilane (PhTMS), phenyltriethoxysilane (PhTES), or dimethyldimethoxysilane (DMDMS). Silanization of the gels is carried out in a hexane bath containing 20 vol % hydrophobe at 50° C. for 24 h using a 4:1 fluid:gel ratio. The molar ratio of the hydrophobe in the fluid to Si in the gel ranges from 2.8-5.0 depending on which hydrophobe is used. The gels are washed with hexane two times in 24 h, then subjected to solvent extraction with supercritical $CO_2$, and then dried for 2 h at 110° C.

Example 12

Silica gel is prepared by the hydrolysis and condensation of TEOS, diluted in EtOH, in the presence of oxalic acid catalyst. The molar ratio of TEOS:EtOH:$H_2$O:oxalic acid is 1:7.60:10.64:1.92×10$^{-4}$, with the oxalic acid introduced together with the water as 1 mM oxalic acid. The targeted silica aerogel density is 0.07-0.08 g/cc. The sol is stirred for 15 min, then cast into a fiber reinforcing phase, and allowed to gel in a 60° C. oven.

The fiber reinforcing phase is a silica PD batting with 9-micron diameter fibers, about 10 mm thick with a density of about 3.8 oz/sq ft. The resulting aerogel material is about 45 wt % aerogel and 55 wt % fiber, resulting in an expected material density of about 0.16-0.20 g/cc (given a 0.07-0.08 g/cc aerogel density, not including the hydrophobic treatment).

The gel is transferred to a bath containing 20 vol % of a hydrophobic reagent in methanol and heated at 45° C. for 24 h using at 4:1 fluid:gel ratio. The hydrophobic reagent is one of the following: methyltrimethoxysilane (MTMS), methyltriethoxysilane (MTES), ethyltriethoxysilane (ETES), or phenyltriethoxysilane (PhTES). The molar ratio of the hydrophobe in the fluid to Si in the gel ranges from 2.8-4.8 depending on which hydrophobe is used. The gels are then washed with EtOH three times, 6 h each time, at 45° C., then subjected to solvent extraction with supercritical $CO_2$, and then dried for 2 h at 110° C.

Example 13

Examples 1, 2, 6, 7, 8, and 9 produced aerogel compositions with about 7.0-9.0 wt % hydrophobic organic content in the aerogel material (3.0-5.0 wt % of the composite) expected in each example. Example 4 produced aerogel compositions with about 9.0-11.0 wt % hydrophobic organic content in the aerogel material (4.0-6.0 wt % of the composite). Examples 7 and 8 also produced aerogel compositions with about 11.0 wt % and 19.0 wt % PhTES hydrophobic organic content in the aerogel material (6.0-9.0 wt % of the composite). Examples 3 and 5 can produce aerogel compositions with about 9.0-11.0 wt % hydrophobic organic content in the aerogel material under adjusted production conditions (amount of hydrophobic material, time, temp, etc). Examples 10-12 can produce aerogel compositions with about 7.0-9.0 wt % hydrophobic organic content in the aerogel material under adjusted production conditions (amount of hydrophobic material, time, temp, etc).

Samples produced in Examples 1, 2, 6, 7, 8, and 9, as well as samples produced in Example 4 which comprise silicon carbide powder, were subjected to heat treatment in a tube furnace under $N_2$, with a temperature ramp rate of 10° C./min until a selection of treatment temperatures ranging between 200° C. and 700° C. were reached. After a treatment duration period was complete, the furnace was allowed to cool at a cooling ramp of 5° C./min, and the samples were removed.

The treated samples included: 7% MTES samples from Example 2; 7% $NaSiO_3CH_3$ samples from Example 1; 7%, 8% and 9% BTESE samples from Example 9; 8% and 9% PhTES samples from Example 6; 7%, 11% and 19% PhTES samples from Example 7; and 7%, 11% and 19% PhTES samples from Example 8. Samples were subjected to heat treatment under various temperatures ranging between 200° C. and 700° C., for durations of time ranging between 10 seconds and 1 hours. Samples treated at 475° C. for 10 minutes and 525° C. for 10 minutes were selected for further testing.

Samples produced in Example 4 which comprise titanium dioxide powder were subjected to heat treatment by sealing sample coupons from each batch in stainless steel foil bags and inserting the bags into a preheated inert furnace at various temperatures between 450° C. and 800° C. for a period of no greater than 60 minutes.

Treated samples from Example 4 (titanium dioxide powder or silicon carbide powder) are identified in the present disclosure by the powder material (S=Silicon carbide; T=titanium dioxide), by the heat treatment temperature (450-800) and by the treatment time (0-60).

Heat treatment of samples from 7%, 8% and 9% BTESE showed signs of decomposition starting at about 475° C. Heat treatment of samples from PhTES all showed signs of unstable phenyl species at high temperatures above 400° C.

Example 14

Table 1 presents density measurements for treated aerogel composite samples from Example 13. Density measurements were completed according to ASTM C167. All composite aerogel samples had measured densities below 0.216 g/cc.

Example 15

Table 1 presents thermal conductivity (TC) measurements for treated aerogel composite samples from Example 13. TC measurements were completed according to ASTM C177 at a temperature of about 37.5° C. and a compression of 2 psi (8×8 samples) or 8 psi (4×4 samples).

All treated aerogel composite samples had thermal conductivity measurements at or below 31.6 mW/mK.

Example 16

An aerogel composition with about 7.0-8.0 wt % hydrophobic organic content is typically expected to be hydrophilic as produced, with an expected C1511 water uptake value (under 15 minute submersion in ambient conditions) of about 350 wt % or higher.

Table 1 presents liquid water uptake measurements for treated aerogel composite samples from Example 13, both before and after reduced oxygen heat treatment. All measurements were made according ASTM C1511 (under 15 minute submersion in ambient conditions).

Pre-treatment samples for 7% MTES and 7% $NaSiO_3CH_3$ both had liquid water uptake measurements above 400 wt % water uptake. Pre-treatment samples for 7%, 8% and 9% BTESE all had liquid water uptake measurements above 340 wt % water uptake. Pre-treatment samples for PhTES materials all had liquid water uptake measurements above 280%.

Post-treatment samples for 7% MTES had liquid water uptake measurements of about 0.0 wt % water uptake, which is lower than pre-treatment samples for 7% MTES. Post-treatment samples for 7% NaSiO$_3$CH$_3$ had liquid water uptake measurements of about 81 wt % water uptake (for samples heat treated at 475° C. for 10 min). All post-treatment samples for BTESE had liquid water uptake measurements above 290 wt % water uptake. All post-treatment samples for PhTES had liquid water uptake measurements above 275 wt % water uptake.

Example 17

Table 1 presents heat of combustion (HOC) measurements for treated aerogel composite samples from Example 13, both before and after reduced oxygen heat treatment. HOC measurements were completed according to conditions comparable to ISO 1716 measurement standards.

Pre-treatment samples for 7% MTES had HOC measurements of about 600 cal/g; post-treatment samples (heat treated at 525° C. for 10 min) had HOC measurements of about 425 cal/g. Pre-treatment samples for 7% NaSiO$_3$CH$_3$ had HOC measurements of about 415 cal/g; post-treatment samples (heat treated at 525° C. for 10 min) had HOC measurements of about 140 cal/g. Pre-treatment samples for 9% BTESE had HOC measurements of about 780 cal/g; post-treatment samples for 9% BTESE (heat treated at 525° C. for 10 min) had HOC measurements of about 285 cal/g. Pre-treatment samples for 9% PhTES (from Example 3-1) had HOC measurements of about 437 cal/g; post-treatment samples (heat treated at 525° C. for 10 min) had HOC measurements of about 144 cal/g. Pre-treatment samples for 7% PhTES (from Example 3-3) had HOC measurements of about 351 cal/g; post-treatment samples (heat treated at 400° C. for 10 min) had HOC measurements of about 120 cal/g. Pre-treatment samples for 11% PhTES (from Example 3-3) had HOC measurements of about 403 cal/g; post-treatment samples (heat treated at 400° C. for 10 min) had HOC measurements of about 110 cal/g.

Example 18

FIG. 1 shows CP/MAS $^{29}$Si Solid State NMR analysis for 7% MTES samples from Example 13, both before and after reduced oxygen heat treatment at 525° C. for 10 minutes.

Pre-treatment samples for 7% MTES showed $T^{1-2}$:$T^3$ ratios of about 0.463, and $Q^{2-3}$:$Q^4$ ratios of about 1.961. Post-treatment samples for 7% MTES showed $T^{1-2}$:$T^3$ ratios of about 0.272, and $Q^{2-3}$:$Q^4$ ratios of about 0.842. Overlapping peaks were deconvoluted an integrated individually to obtain ratios.

Example 19

Figure 2:
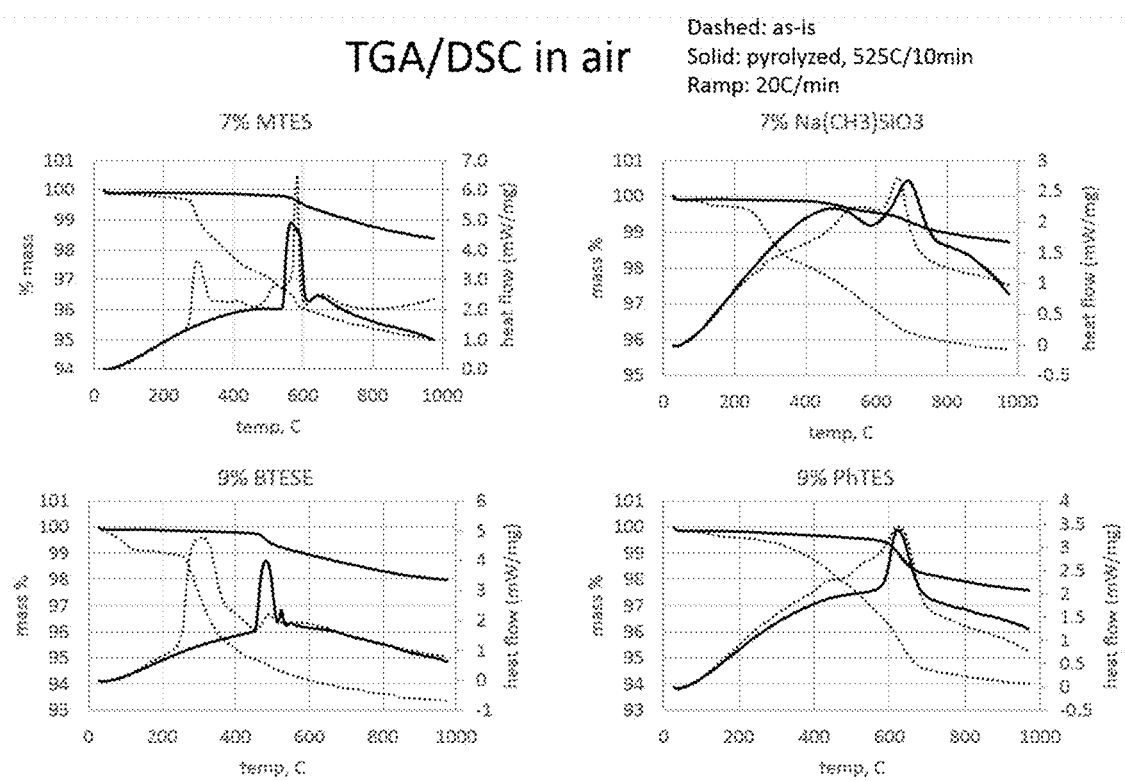
FIG. 2 is a graph depicting the TGA/DSC analysis for examples of aerogel compositions of the present disclosure.

FIG. 2 shows TGA/DSC analysis for 7% MTES samples, 7% NaSiO$_3$CH$_3$ samples, 9% BTESE samples, and 9% PhTES (Example 3-1) samples from Example 13, both before and after reduced oxygen heat treatment at 525° C. for 10 minutes. TGA/DSC analysis was completed for temperatures ranging from ambient temperature up to 1000° C., with a ramp rate of 20° C./min.

Table 1 presents the onset of thermal decomposition temperatures (° C.) for the post-treatment samples, based on the TGA/DSC analysis plots shown in FIG. 2.

Post-treatment samples for 7% MTES (heat treated at 525° C. for 10 min) had $T_d$ measurements of about 545° C. Post-treatment samples for 7% NaSiO$_3$CH$_3$ (heat treated at 525° C. for 10 min) had $T_d$ measurements of about 600° C. Post-treatment samples for 9% BTESE (heat treated at 525° C. for 10 min) had $T_d$ measurements of about 460° C. Post-treatment samples for 9% PhTES (heat treated at 525° C. for 10 min) had $T_d$ measurements of about 595° C.

TABLE 1

| Example | Composite Density (g/cc) | Thermal Conductivity** (mW/M-K) | Liquid Water Uptake* (wt %) | Liquid Water Uptake** (wt %) | HOC* (cal/g) | HOC** (cal/g) | Td** (° C.) |
| --- | --- | --- | --- | --- | --- | --- | --- |
| 1 | 0.173 | 30.5 | ~450 | 81.0 | 416 | 142 | 600 |
| 2 | 0.159 | 25.1 | ~425 | 0.0 | 601 | 426 | 544 |
| 4-T-5-600 | 0.206 | 15.9 | — | 5.8 | — | 269 | 636 |
| 4-T-10-600 | ~0.200 | — | — | 0.9 | — | — | 626 |
| 4-T-5-625 | 0.187 | 15.8 | — | 4.5 | — | 317 | 624 |
| 4-T-10-625 | ~0.185 | — | — | 1.7 | — | — | 625 |
| 4-T-5-650 | 0.203 | 16.85 | — | 1.5 | — | 265 | 636 |
| 4-T-20-650 | ~0.200 | — | — | 1.5 | — | — | 625 |
| 4-S-10-525 | 0.202 | 16.0 | — | 2.5 | — | 355 | 609 |
| 4-S-10-550 | 0.216 | 18.0 | — | 0.0 | — | 316 | 610 |
| 4-S-10-575 | 0.212 | — | — | 0.0 | — | 343 | 625 |
| 6-8% | 0.142 | — | 475 | 401.0 | 252 | — | — |
| 6-9% | 0.148 | 21.0 | 480 | 432.0 | 437 | 144 | 594 |
| 7-7% | 0.185 | 20.3 | 450 | 360.0 | 715 | 146 | — |
| 7-11% | 0.182 | 24.9 | 371 | 311.0 | 868 | 352 | — |
| 7-19% | 0.199 | 31.2 | 283 | 277.0 | 1076 | 571 | — |
| 8-7% | 0.180 | 17.9 | 403 | 354.0 | 351 | 132 | — |
| 8-11% | 0.177 | 17.5 | 412 | 413.0 | 403 | 157 | — |
| 8-19% | 0.175 | 18.7 | 461 | 404.0 | 531 | 303 | — |
| 9-7% | 0.182 | — | ~400 | 343.0 | 612 | — | — |
| 9-8% | 0.180 | — | ~355 | 328.0 | — | — | — |
| 9-9% | 0.183 | 31.6 | ~345 | 297.0 | 780 | 287 | 459 |

*Before reduced oxygen heat treatment
**After reduced oxygen heat treatment at 475° C.-525° C. for 10 min, unless otherwise indicated
— No measurement taken As used herein, the conjunction "and" is intended to be inclusive and the conjunction "or" is not intended to be exclusive unless otherwise indicated. For example, the phrase "or, alternatively" is intended to be exclusive.

The use of the terms "a", "an", "the", or similar referents in the context of describing the disclosure (especially in the context of the claims) are to be construed to cover both the singular and the plural, unless otherwise indicated herein or clearly contradicted by context.

The terms "comprising," "having," "including," and "containing" are to be construed as open-ended terms (i.e., meaning "including, but not limited to,") unless otherwise noted.

As used herein, the term "about" refers to a degree of deviation typical for a particular property, composition, amount, value or parameter as identified; such as deviations based on experimental errors, measurement errors, approximation errors, calculation errors, standard deviations from a mean value, routine minor adjustments, and so forth.

Recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as", "for example") provided herein, is intended merely to better illuminate the disclosure and does not pose a limitation on the scope of the disclosure unless otherwise claimed.

What is claimed is:

1. A reinforced hydrophobic aerogel composition comprising a silica-based framework and a reinforcement material, wherein the reinforced hydrophobic aerogel composition has an onset of thermal decomposition of hydrophobic organic materials of 515° C. or higher.

2. The reinforced hydrophobic aerogel composition of claim 1, wherein the reinforcement material comprises a fiber reinforcement material or a sheet of the fiber reinforcement material.

3. The reinforced hydrophobic aerogel composition of claim 1, wherein the reinforcement material comprises a material other than a fiber reinforcement material.

4. The reinforced hydrophobic aerogel composition of claim 1, wherein the reinforced hydrophobic aerogel composition has a liquid water uptake of 40 wt % or less.

5. The reinforced hydrophobic aerogel composition of claim 1, wherein the reinforced hydrophobic aerogel composition has a heat of combustion of 717 cal/g or less.

6. The reinforced hydrophobic aerogel composition of claim 5, wherein the reinforced hydrophobic aerogel composition has a heat of combustion of between 265 cal/g and 600 cal/g.

7. The reinforced hydrophobic aerogel composition of claim 5, wherein the reinforced hydrophobic aerogel composition has a heat of combustion of between 265 cal/g and 460 cal/g.

8. The reinforced hydrophobic aerogel composition of claim 1, wherein the reinforced hydrophobic aerogel composition has a thermal conductivity of 40 mW/M*K or less.

9. The reinforced hydrophobic aerogel composition of claim 8, wherein the reinforced hydrophobic aerogel composition has a thermal conductivity between 15 mW/M*K and 30 mW/M*K.

10. The reinforced hydrophobic aerogel composition of claim 1, wherein the reinforced hydrophobic aerogel composition has a density of 0.40 g/cm3 or less.

11. The reinforced hydrophobic aerogel composition of claim 1, wherein the reinforced hydrophobic aerogel composition has an onset of thermal decomposition of hydrophobic organic materials of between 525° C. and 635° C.

12. The reinforced hydrophobic aerogel composition of claim 1, wherein a content of the hydrophobic organic materials in the reinforced hydrophobic aerogel composition is between 2 wt % and 10 wt %.

13. The reinforced hydrophobic aerogel composition of claim 1, wherein the reinforced hydrophobic aerogel composition has a ratio of $T^{1-2}:T^3$ of between about 0.01 and 0.4, and a ratio of $Q^{2-3}:Q^4$ of between about 0.1 and 1.5.

14. The reinforced hydrophobic aerogel composition of claim 1, wherein the reinforced hydrophobic aerogel composition is in the form of a blanket.

15. A hydrophobic aerogel composition comprising a silica-based framework and a reinforcement material, wherein the reinforced hydrophobic aerogel composition has the following properties:
    an onset of thermal decomposition of hydrophobic organic materials of 515° C. or higher, and
    a content of the hydrophobic organic materials in the aerogel composition is between 2 wt % and 10 wt %.

16. The hydrophobic aerogel composition of claim 15, wherein the hydrophobic aerogel composition has a heat of combustion of 717 cal/g or less.

17. A reinforced hydrophobic aerogel composition comprising a silica-based framework and a reinforcement material, wherein the reinforced hydrophobic aerogel composition has a ratio of $T^{1-2}:T^3$ of between about 0.01 and 0.4, and a ratio of $Q^{2-3}:Q^4$ of between about 0.1 and 1.5.

18. The reinforced hydrophobic aerogel composition of claim 17, wherein the reinforced hydrophobic aerogel composition has an onset of thermal decomposition of hydrophobic organic materials of 515° C. or higher.

19. The reinforced hydrophobic aerogel composition of claim 18, wherein the reinforced hydrophobic aerogel composition has a content of the hydrophobic organic materials in the aerogel composition is between 2 wt % and 10 wt0lo.

20. The reinforced hydrophobic aerogel composition of claim 19, wherein the reinforced hydrophobic aerogel composition has a heat of combustion of 717 cal/g or less.

\* \* \* \* \*